(12) United States Patent
Sharma et al.

(10) Patent No.: US 10,906,479 B2
(45) Date of Patent: Feb. 2, 2021

(54) DOOR EDGE PROTECTOR DEVICE

(71) Applicant: U-SHIN LTD., Tokyo (JP)

(72) Inventors: Manu Sharma, Haryana (IN);
Himanshu Chaman, Haryana (IN);
Madhan Kumar B, Haryana (IN);
Toshikazu Making, Hiroshima (JP)

(73) Assignee: U-SHIN LTD., Tokyo (JP)

( * ) Notice: Subject to any disclaimer, the term of this patent is extended or adjusted under 35 U.S.C. 154(b) by 187 days.

(21) Appl. No.: 15/765,863

(22) PCT Filed: Oct. 25, 2016

(86) PCT No.: PCT/JP2016/081572
§ 371 (c)(1),
(2) Date: Apr. 4, 2018

(87) PCT Pub. No.: WO2017/073558
PCT Pub. Date: May 4, 2017

(65) Prior Publication Data
US 2018/0281704 A1 Oct. 4, 2018

(30) Foreign Application Priority Data
Oct. 26, 2015 (IN) .......................... 5737/CHE/2015

(51) Int. Cl.
*B60R 13/04* (2006.01)
(52) U.S. Cl.
CPC .................. *B60R 13/043* (2013.01)
(58) Field of Classification Search
CPC .................................................. B60R 13/043
See application file for complete search history.

(56) References Cited

U.S. PATENT DOCUMENTS 2,678,232 A * 5/1954 Barry .................... B60R 13/043
49/462
3,280,510 A * 10/1966 Vaux .................... B60R 13/043
49/401
(Continued)

FOREIGN PATENT DOCUMENTS

DE 102006053275 A1 * 5/2008 .......... B60R 13/043
EP 2 743 138 6/2014
(Continued)

OTHER PUBLICATIONS

International Preliminary Report on Patentability dated May 1, 2018 in International Patent Application No. PCT/JP2016/081572, with English Translation.
(Continued)

*Primary Examiner* — Catherine A Kelly
(74) *Attorney, Agent, or Firm* — Wenderoth, Lind & Ponack, L.L.P.

(57) ABSTRACT

A door edge protector device includes a protector, a cam member and a link mechanism. Cam portions are formed in the cam member, and the cam member is rotated by an input corresponding to a close/open state of a door. The link mechanism includes cam followers which are engaged with the cam portions, and the protector is attached to the link mechanism. By the engagement between the cam portions and the cam followers, the link mechanism moves in an interlocking manner with rotation of the cam member. A locus T includes an accommodated position corresponding to the close state of the door and a set position covering a door edge corresponding to the close state of the door. The cam portions are configured so that the protector moves along the locus by movement of the link mechanism.

13 Claims, 29 Drawing Sheets

(56) References Cited

U.S. PATENT DOCUMENTS

| | | | | | |
|---|---|---|---|---|---|
| 3,473,264 | A | * | 10/1969 | Holka | B60R 13/043 49/462 |
| 4,221,411 | A | * | 9/1980 | Kawada | B60R 13/043 293/118 |
| 4,839,991 | A | * | 6/1989 | Rathgeb | B60R 13/043 49/462 |
| 4,926,707 | A | * | 5/1990 | Yamada | E05B 81/06 292/201 |
| 5,052,714 | A | * | 10/1991 | Muscat | B60R 13/005 280/762 |
| 5,305,969 | A | * | 4/1994 | Odell | B64C 1/1407 244/129.5 |
| 8,303,021 | B2 | * | 11/2012 | Lichter | B60R 13/043 293/118 |
| 8,516,748 | B2 | * | 8/2013 | Tensing | B60R 13/043 292/1 |
| 8,826,596 | B2 | | 9/2014 | Tensing | |

FOREIGN PATENT DOCUMENTS

| | | |
|---|---|---|
| GB | 2 405 435 | 3/2005 |
| JP | 54-6226 | 1/1979 |
| JP | 3099296 | 11/2003 |

OTHER PUBLICATIONS

International Search Report dated Dec. 6, 2016 in International (PCT) Application No. PCT/JP2016/081572.

* cited by examiner

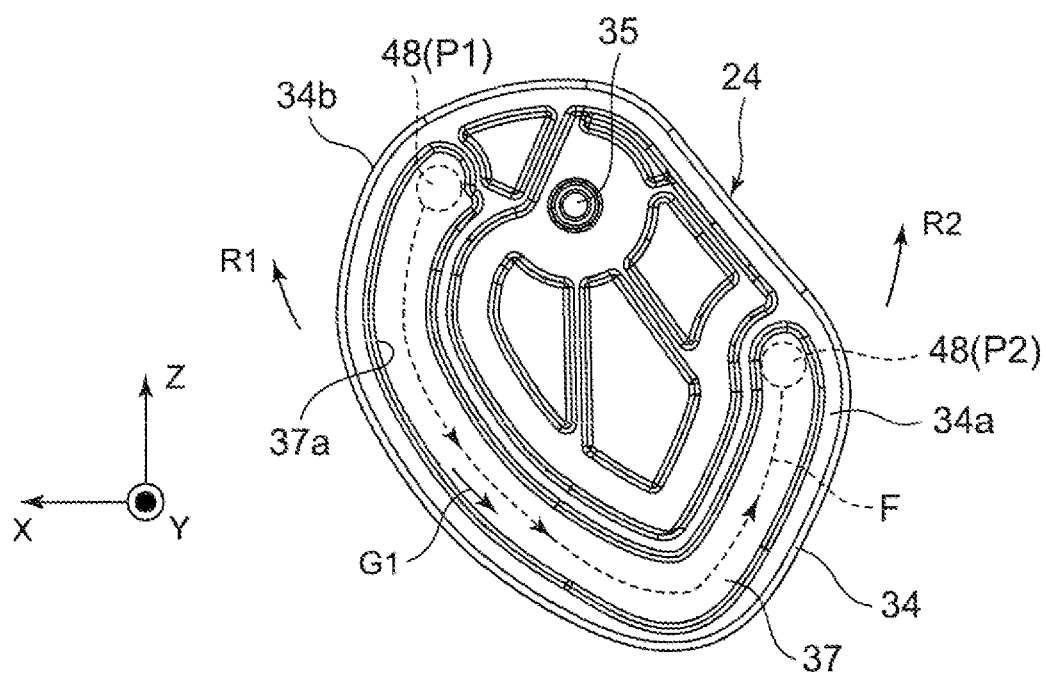

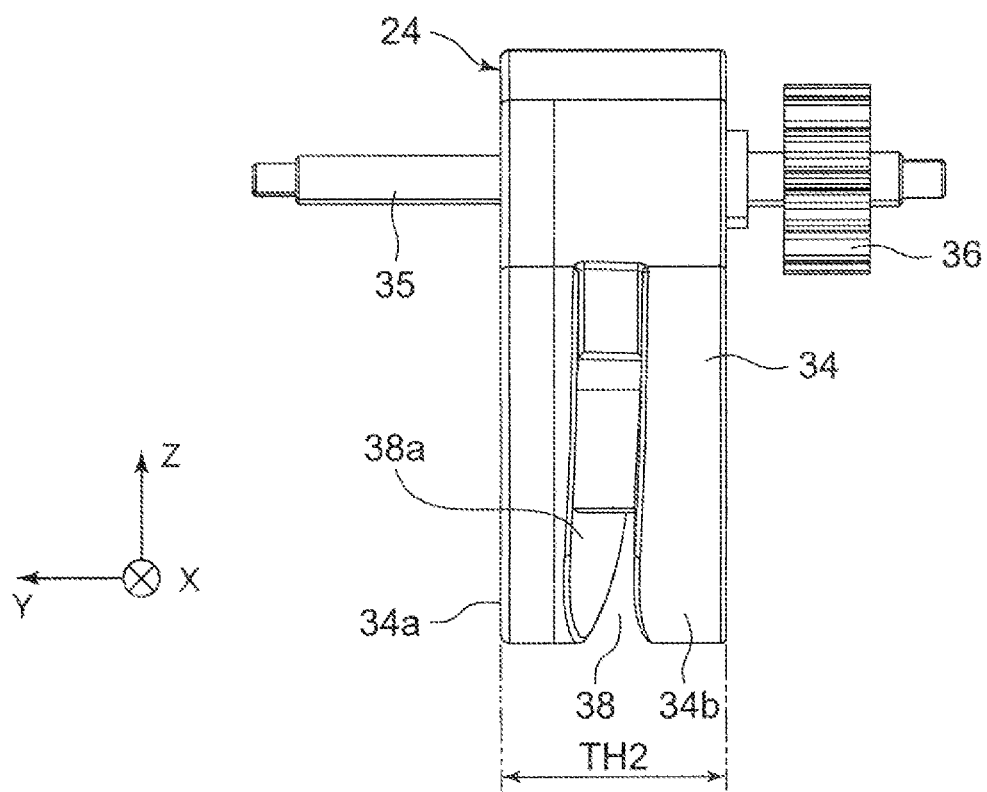

_US 10,906,479 B2_

DOOR EDGE PROTECTOR DEVICE

CROSS-REFERENCE TO RELATED APPLICATIONS

This is a national phase application in the United States of International Patent Application No. PCT/JP2016/081572 with an international filing date of Oct. 25, 2016, which claims priority of Indian Patent Application No. 5737/CHE/2015 filed on Oct. 26, 2015 the contents of which are incorporated herein by reference.

TECHNICAL FIELD

The present invention relates to a door edge protector device.

BACKGROUND ART

A door edge protector device disclosed in U.S. Pat. No. 8,826,596 B includes a movable protector. Specifically, this protector moves along an arc locus in an interlocking manner with close/open movement of a vehicle door to protect a door edge only when the vehicle door is opened. The door edge is an edge of one of both ends of the vehicle door in a longitudinal direction thereof. In other words, the door edge is the edge of a tip end-side end of the vehicle door in a longitudinal direction thereof which is opposite from a hinge-side end.

According to the door edge protector device disclosed in U.S. Pat. No. 8,826,596 B, a mechanism which is a combination of a link mechanism and a curved surface of a lever achieves movement of the protector. Hence, applying the door edge protector device to different vehicle types having different thickness and shape of the vehicle door requires changes in shapes of the link mechanism and the lever. That is, it is difficult to apply the door edge protector device to different vehicle types due to inevitable large design changes.

It is an object of the present invention to provide a door edge protector device which is easily applied to different vehicle types having different thickness and shape of the vehicle door.

SUMMARY OF THE INVENTION

One aspect of the present invention provides a door edge protector device, including: a protector for covering to protect a door edge which is an edge of a vehicle door; a cam member formed with a cam portion and configured to be rotated by an input corresponding to an close/open state of the vehicle door; and a link mechanism holding the protector, provided with a cam follower engaged with the cam portion, and configured to operate by interlocking with rotation of the cam member by engagement between the cam portion and the cam follower. The cam portion is configured to achieve a movement of the protector along a locus including an accommodation position and a set position, the accommodation position corresponding to the close state of the vehicle door, and a set position corresponding to the open state of the vehicle door and covering the door edge.

According to the door edge protector device of the present invention, a locus along which the protector moves can be changed by changing a shape of the cam portion formed on the cam member. Hence, the door edge protector device can be applied to different vehicle types having different thickness and shape of the vehicle door by changing only the cam member without changing the link mechanism.

BRIEF DESCRIPTION OF THE DRAWINGS

The foregoing and the other features of the present invention will become apparent from the following description and drawings of an illustrative embodiment of the invention in which:

FIG. 8A is a front view of the cam member;

FIG. 8B is a right side view of the cam member;

DETAILED DESCRIPTION OF EMBODIMENTS

Embodiments of the present invention will be described with reference to the accompanying drawings.

First Embodiment

Figure 1:
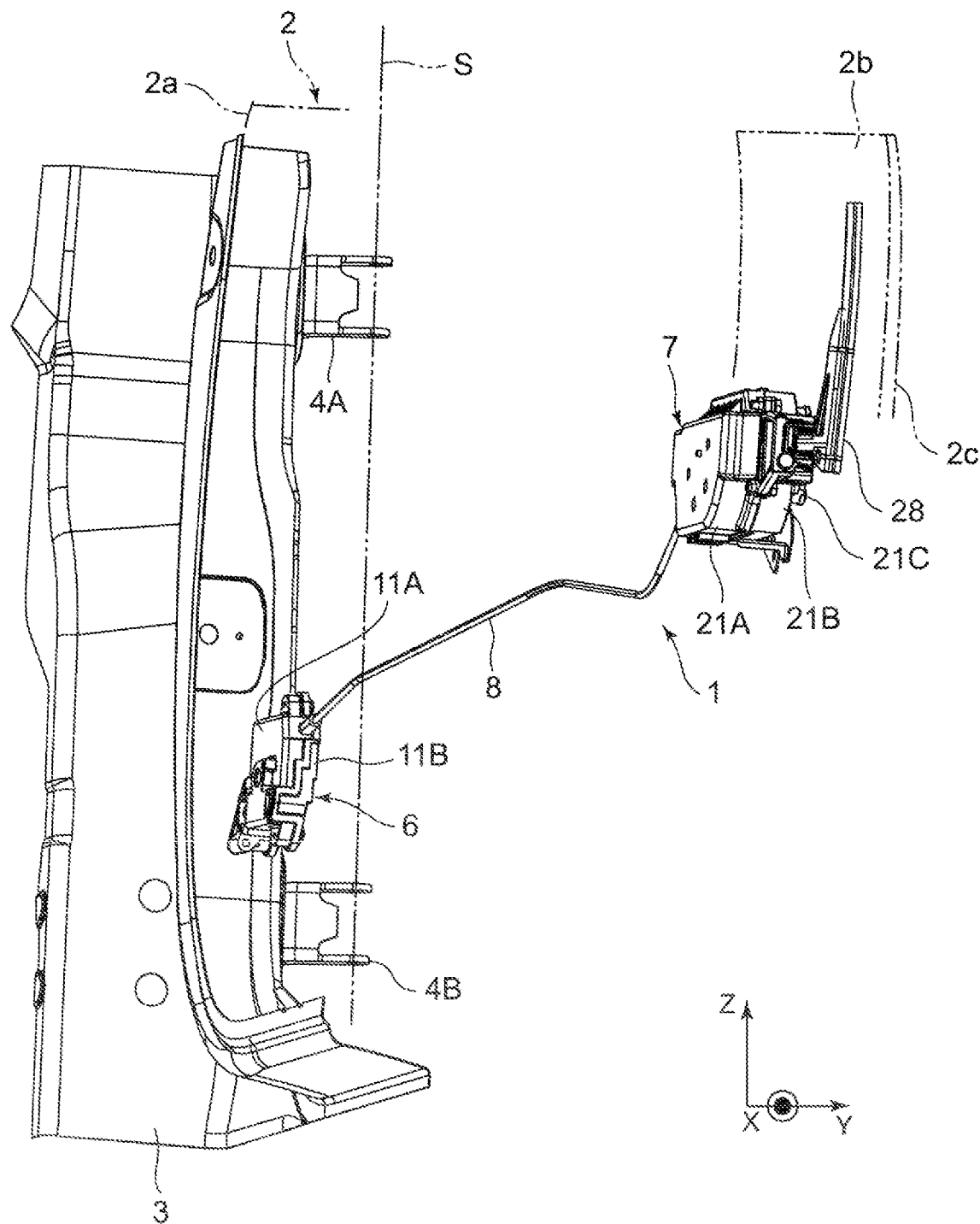
FIG. 1 is a perspective view of a portion of a vehicle including a door edge protector device according to a first embodiment of the present invention.

FIGS. 1 to 11 show a door edge protector device 1 according to a first embodiment of the present invention. With reference to FIG. 1, most portions of the door edge protector device 1 except a later-described plunger 17, a protector 28, and a tip end of a pivot link 42 are accommodated in a vehicle door 2.

A vehicle body 3 is provided with hinge brackets 4A and 4B. The vehicle door 2 is mounted on the vehicle body 3 so that the vehicle door 2 can pivot around a pivot shaft S by hinges mounted on the hinge brackets 4A and 4B (not shown). Hereinafter, one of both ends of the vehicle door 2 in its longitudinal direction which is close to the hinge may be referred to as a hinge-side end 2a, and the other end opposite from the hinge-side end 2a may be referred to as a tip end-side end 2b in some cased. An edge of the tip end-side end 2b may be referred to as a door edge 2c.

An orthogonal coordinate system (XYZ coordinate system) shown in the drawings is set so as to fixed to with respect to the vehicle door 2. That is, when the vehicle door 2 pivots around the pivot shaft S, the orthogonal coordinate system also pivots around the pivot shaft S.

An X axis shows the longitudinal direction of the vehicle door 2. An arrow of the X axis shows a direction toward the tip end-side end 2b (including door edge 2c). Hereinafter, a direction of the arrow of the X axis may be referred to as a +X direction, and a direction opposite from the +X direction may be referred to as a −X direction in some cases. That is, the −X direction shows a direction toward the hinge-side end 2a. Further, the +X direction and the −X direction may be collectively referred to merely as an X direction.

A Y axis shows a width direction of the vehicle door 2. An arrow of the Y axis shows a direction toward an outer side of the vehicle door 2 in the width direction. Hereinafter, a direction of the arrow of the Y axis may be referred to as a +Y direction, and a direction opposite from +Y direction may be referred to as a −Y direction. That is, the −Y direction shows a direction toward an inner side of the vehicle door 2 in the width direction. Further, the +Y direction and the −Y direction may be collectively referred to merely as a Y direction.

A Z axis shows a height direction of the vehicle door 2. An arrow of the Z axis shows an upward direction in the height direction of the vehicle door 2. Hereinafter, a direction of the arrow of the Z axis may be referred to as +Z direction, and a direction opposite from the +Z direction may be referred to a −Z direction in some cases. That is, the −Z direction is a downward direction in the height direction of the vehicle door 2. Further, the +Z direction and the −Z direction may be collectively referred to merely as a Z direction.

As shown in FIG. 1, when the vehicle door 2 is in a close position, the X direction shows a vehicle length direction, the Y direction shows a vehicle width direction, and the Z direction shows a vehicle height direction.

Figure 2:
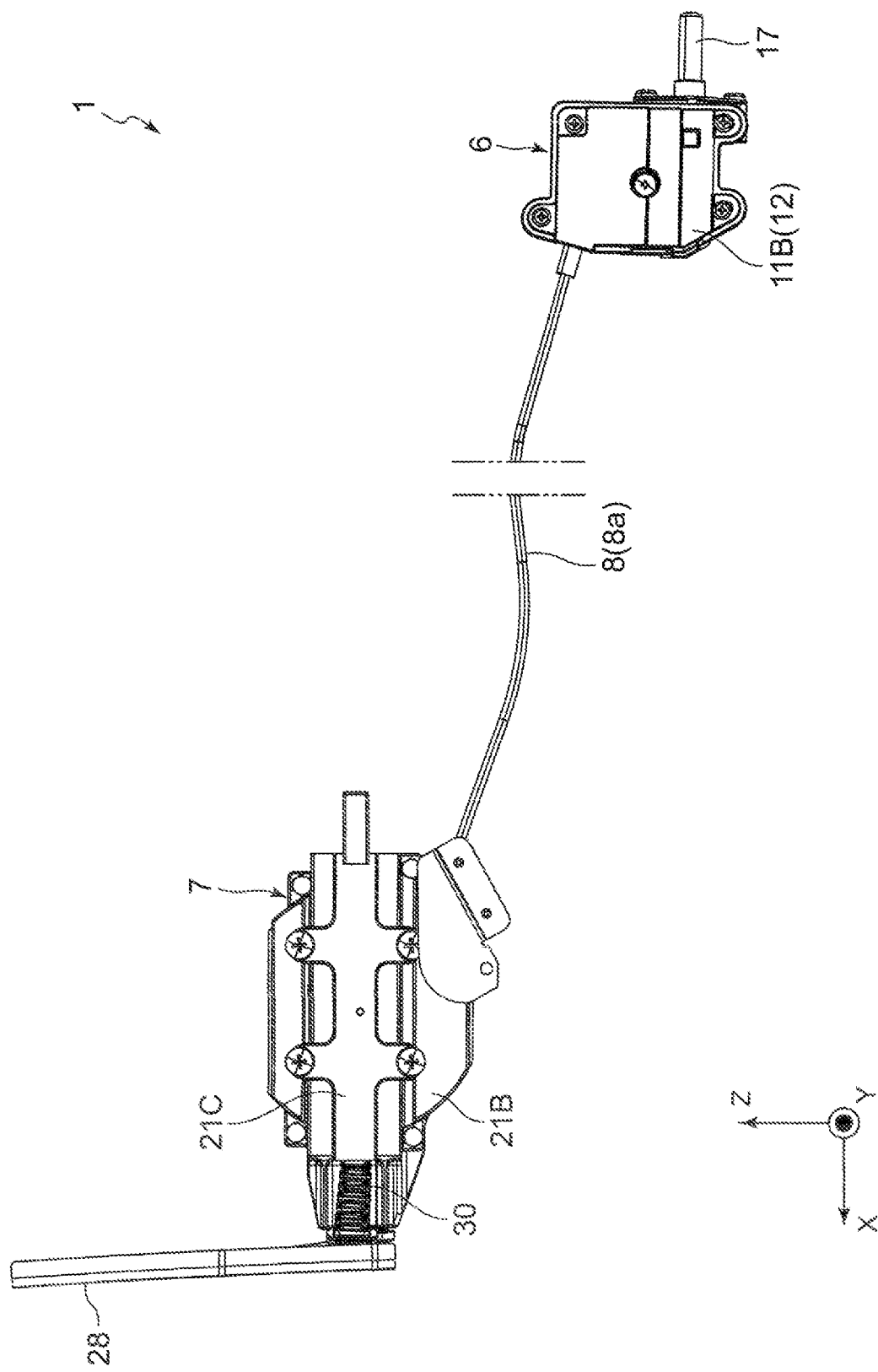
FIG. 2 is a front view of the door edge protector device.
Figure 3:
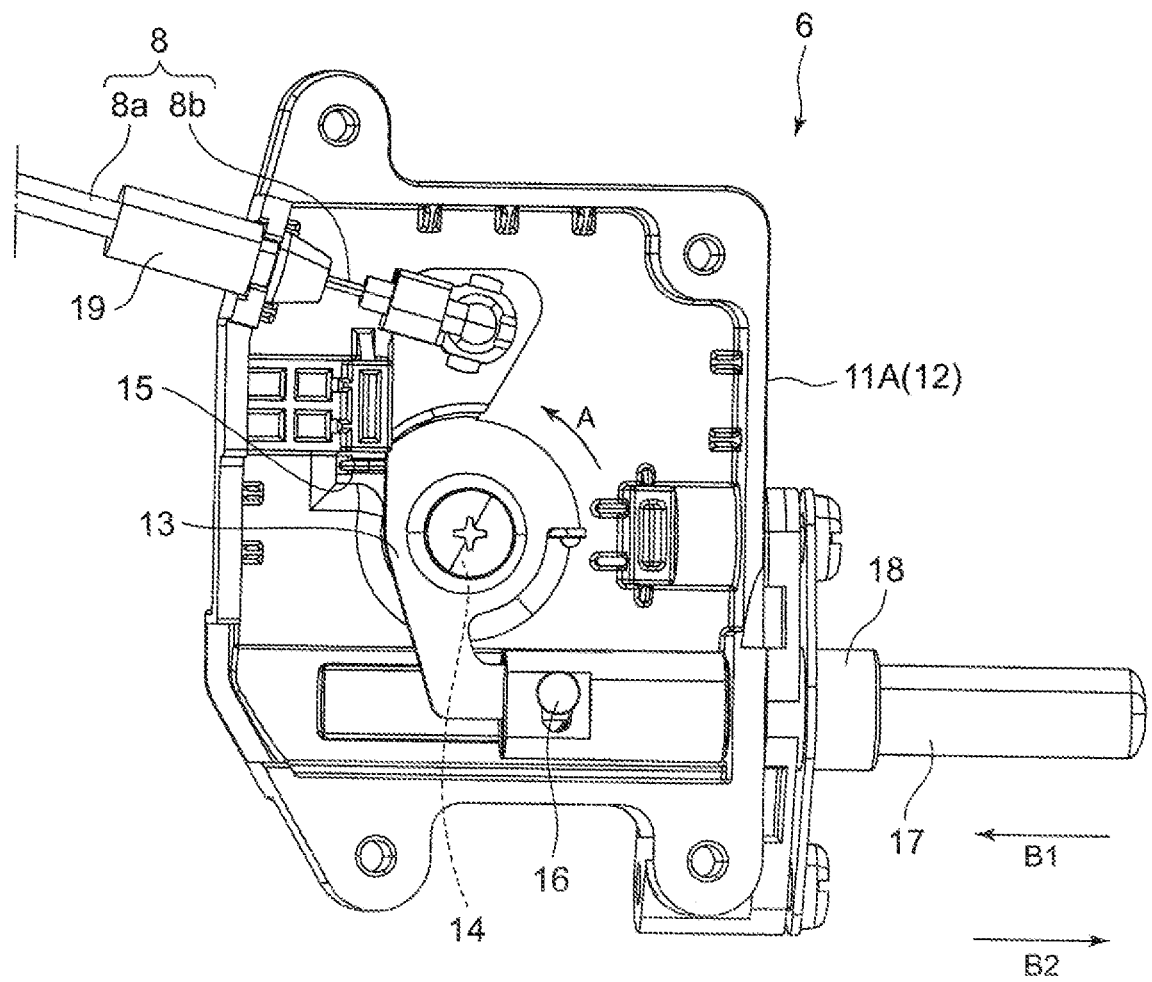
FIG. 3 is a front view of an input unit with a housing being an open state.

Further referring to FIG. 2, the door edge protector device 1 includes an input unit 6, an output unit 7, and a cable 8. The input unit 6 is accommodated in a location in the vicinity of the hinge-side end 2a of the vehicle door 2, and the output unit 7 is accommodated in a location in the vicinity of the tip end-side end 2b of the vehicle door 2. The entire cable 8 is accommodated in the vehicle door 2 and mechanically connects the input unit 6 and the output unit 7 to each other. As shown in FIG. 3, the cable 8 includes an outer cable 8a and an inner cable 8b which is movably inserted into the outer cable 8a.

With reference to FIGS. 1 to 3, the input unit 6 includes a housing 12 composed of bodies 11A and 11B fixed to each other by means of screws. An actuator component 13 is accommodated in the housing 12. The actuator component 13 is pivotally supported by the body 11A through a pivot portion 14 extending in the Y direction. The actuator component 13 is elastically urged by a spring 15 in a direction shown by an arrow A.

A base end of the plunger 17 is connected to the actuator component 13 by means of a pin 16. The plunger 17 is held by a cylindrical portion 18 so that the plunger 17 can linearly move in the X direction as shown by arrows B1 and B2. The cylindrical portion 18 is provided in the body 11A, and both ends of the cylindrical portion 18 open. A tip end of the plunger 17 protrudes outwardly of the housing 12 through the cylindrical portion 18.

One end of the inner cable 8b is connected to a portion of the actuator component 13 which is opposite from the plunger 17. The outer cable 8a is fixed to the body 11A through a cap 19.

The input unit 6 transmits an close/open state of the vehicle door 2 to the output unit 7 through the cable 8. First, when the vehicle door 2 is in the close state, since a tip end of the plunger 17 is pushed into the housing 12 by the vehicle body 3 as shown by an arrow B1, the actuator component 13 rotates against an urging force of the spring 15 in a direction opposite from the arrow A. As a result, when the vehicle door 2 is in the close state, the input unit 6 pulls the inner cable 8b into the housing 12 by a length corresponding to a rotation amount of the actuator component 13. In other words, when the vehicle door 2 is in the close state, the input unit 6 pulls the inner cable 8b from the output unit 7. On the other hand, when the vehicle door 2 is in the open state, the plunger 17 linearly moves in a direction shown by the arrow B2 by the urging force of the spring 15, and the actuator component 13 rotates in the direction of the arrow A. As a result, when the vehicle door 2 is in the open state, the input unit 6 sends the inner cable 8b having the length corresponding to the rotation amount of the actuator component 13 toward the output unit 7.

Figure 4:
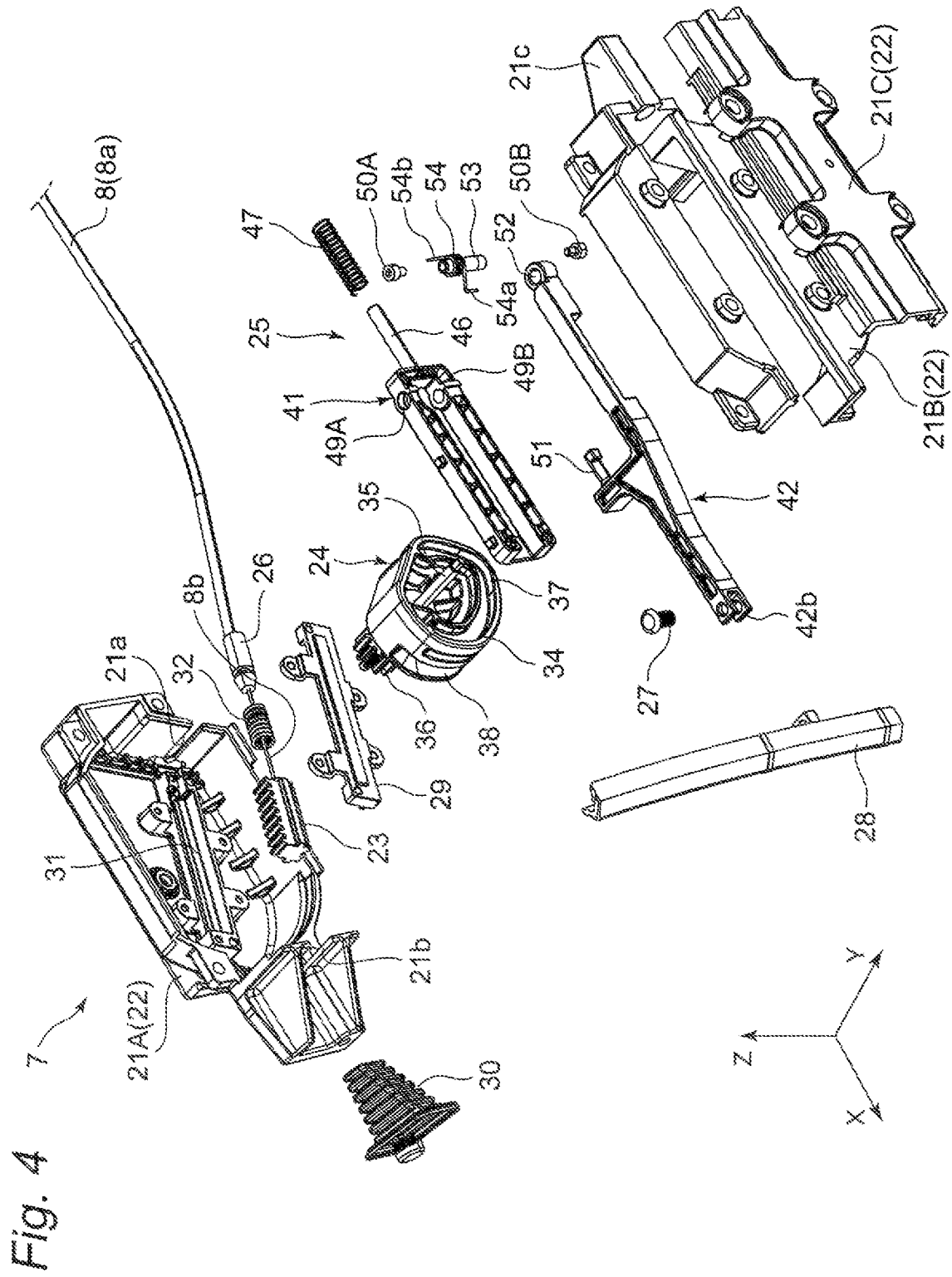
FIG. 4 is an exploded perspective view of an output unit.

With reference to FIGS. 1, 2, and 4, the output unit 7 includes a housing 22 composed of bodies 21A, 21B, and 21C fixed to one another by means of screws (not shown). A rack 23, a cam member 24, and a link mechanism 25 are accommodated in the housing 22. A slit 21a is formed in one end of the body 21A in the X direction. The other end of the inner cable 8b enters the housing 22 through the slit 21a. The outer cable 8a is fixed to the slit 21a through a cap 26. A slit 21b provided on the other end of the body 21A in the X direction allows a tip end 42*b* of the later-described pivot link 42 to insert therethrough. The protector 28 is fixed to a tip end 42*b* of the pivot link 42 protruding outwardly of the housing 22 through the slit 21*b*. That is, the pivot link 42 holes the protector 28. The slit 21*b* has a thin and long shape extending in the Y direction so as to allow pivot movements of the pivot link 42. A grommet 30 is attached to the housing 22 for waterproof.

Figure 6A:
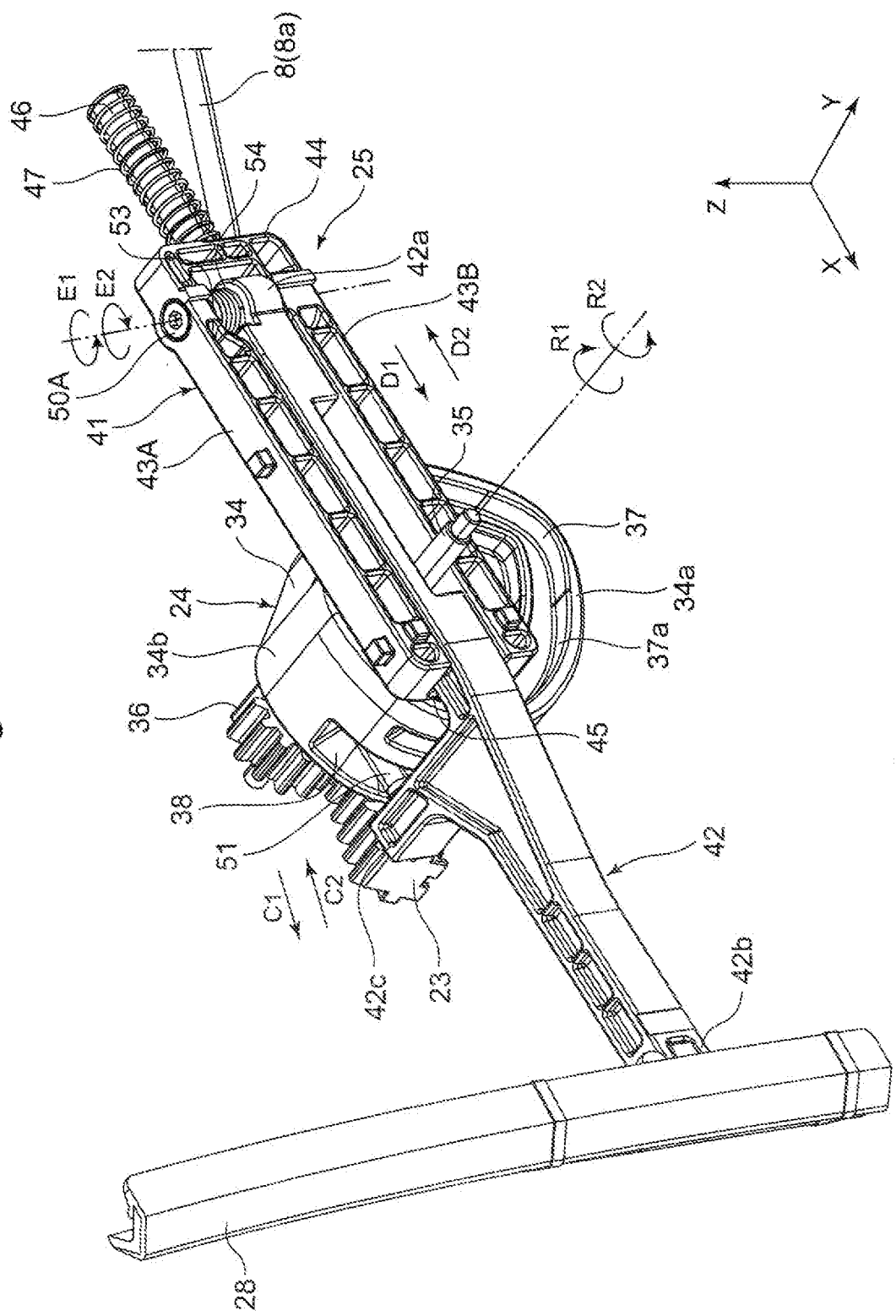
FIG. 6A is a perspective view of an internal mechanism of the output unit.
Figure 6B:
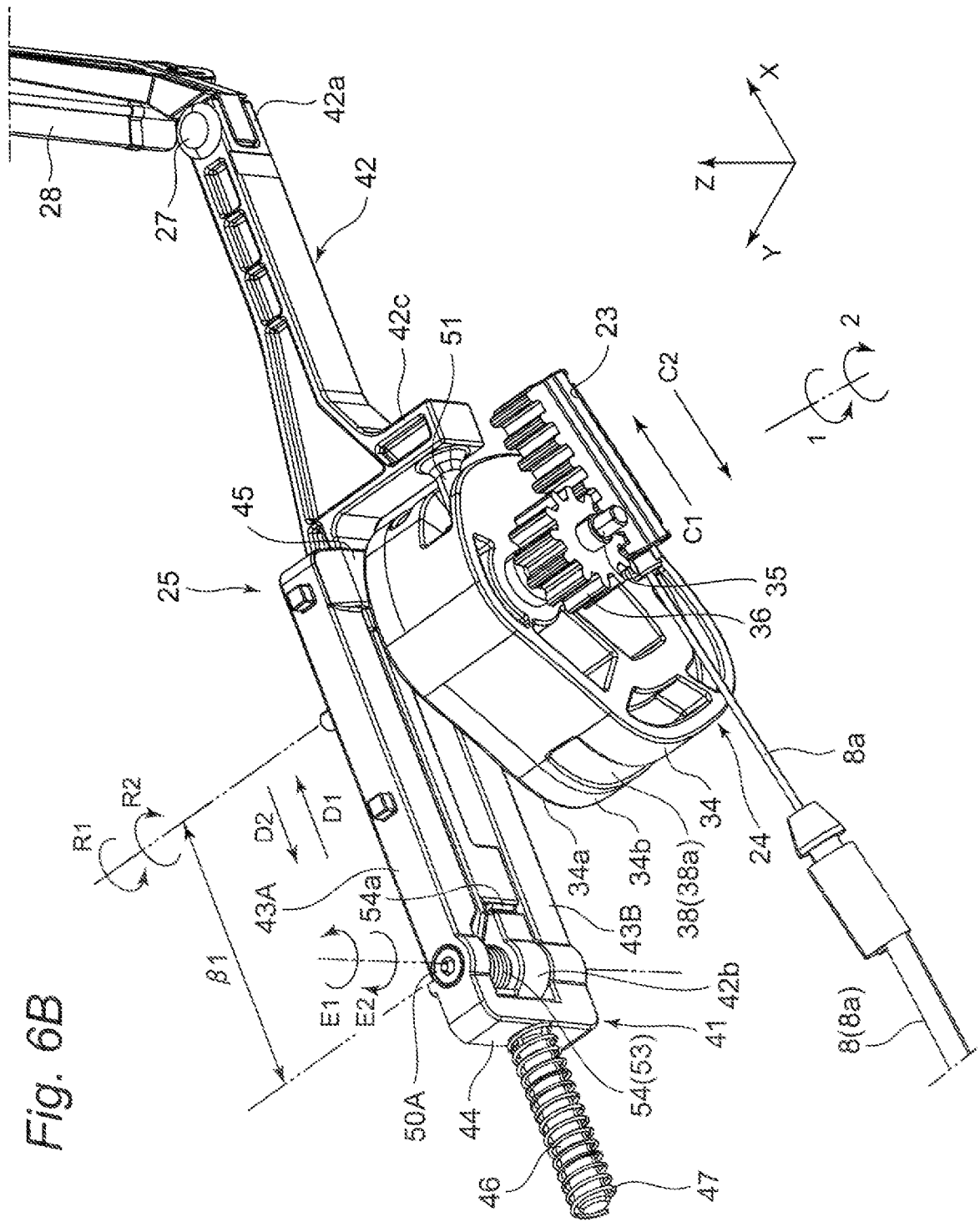
FIG. 6B is a perspective view of the internal mechanism of the output unit as viewed from another angle.
Figure 7A:
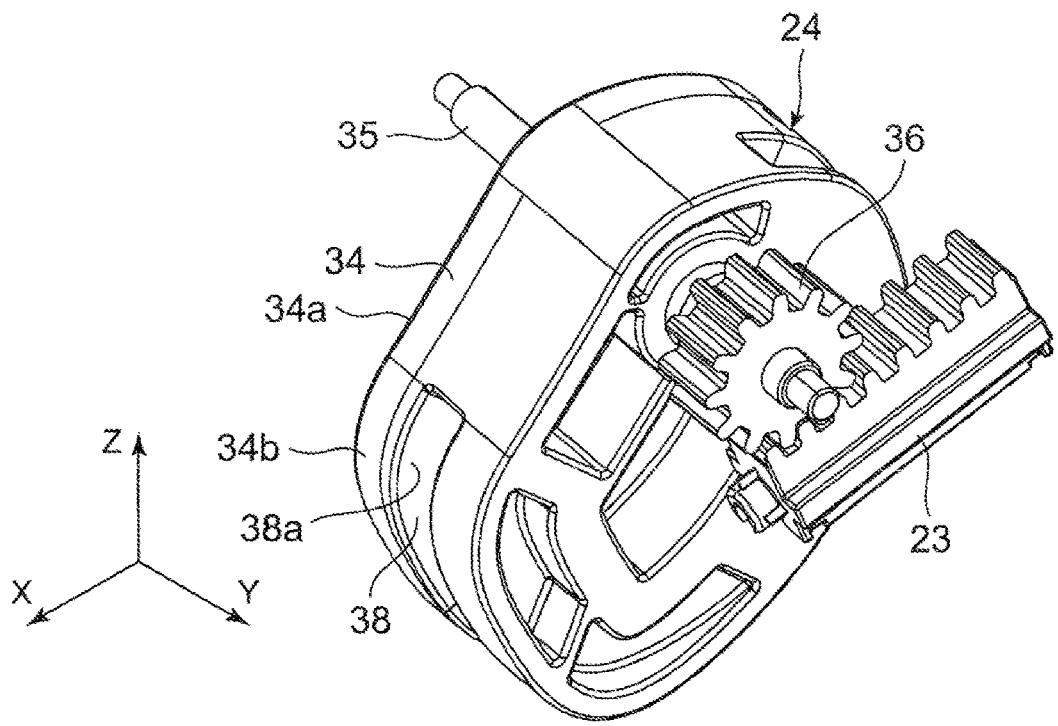
FIG. 7A is a perspective view of a cam member and a rack.
Figure 7B:
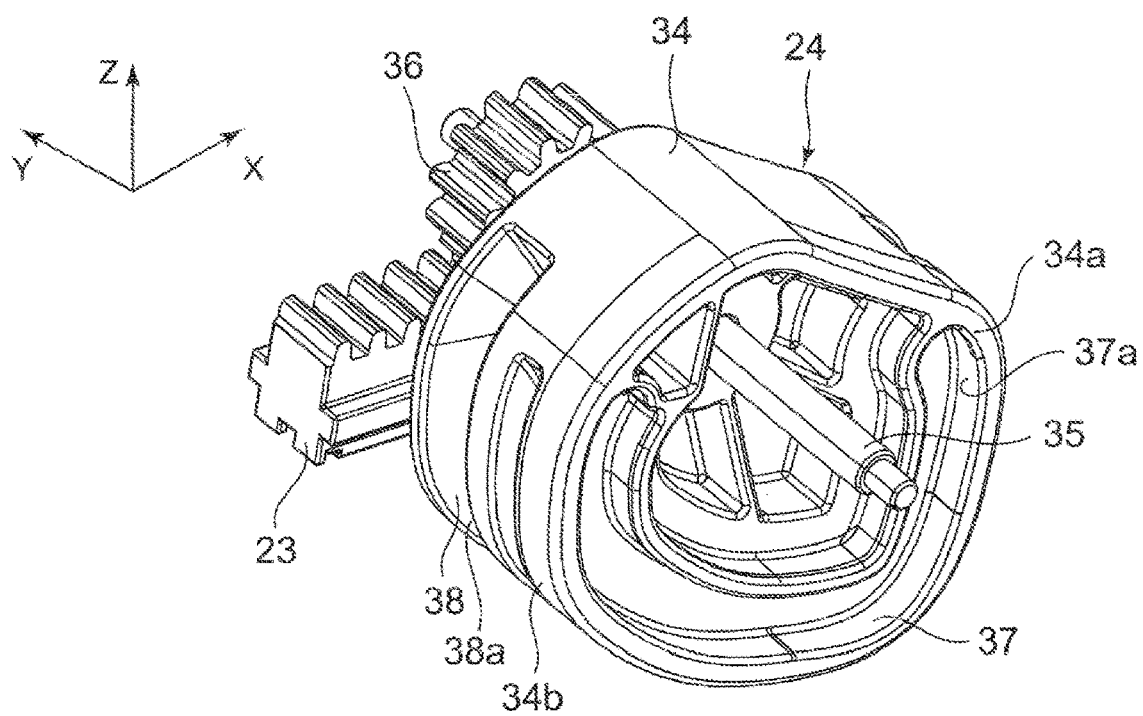
FIG. 7B is a perspective view of the cam member and the rack as viewed from another angle.
Figure 8C:
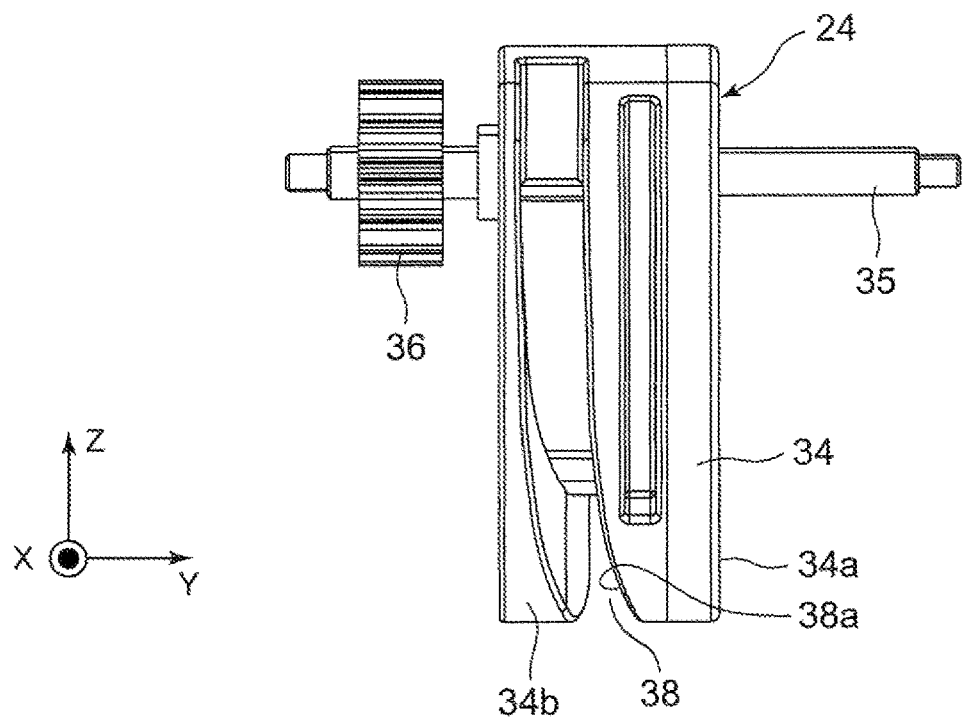
FIG. 8C is a left side view of the cam member.
Figure 8D:
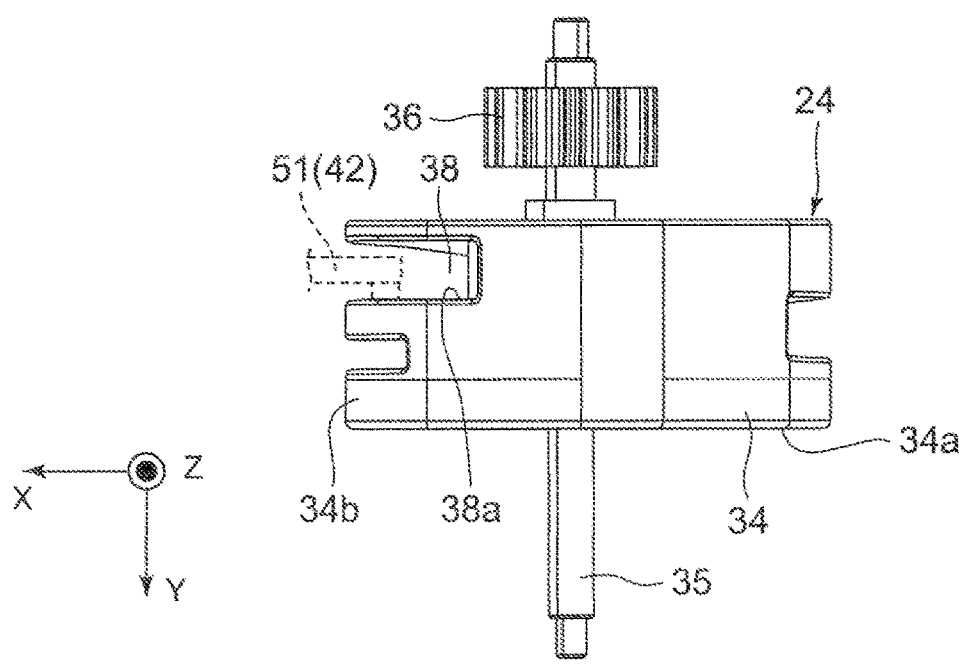
FIG. 8D is a plan view of the cam member.
Figure 8E:
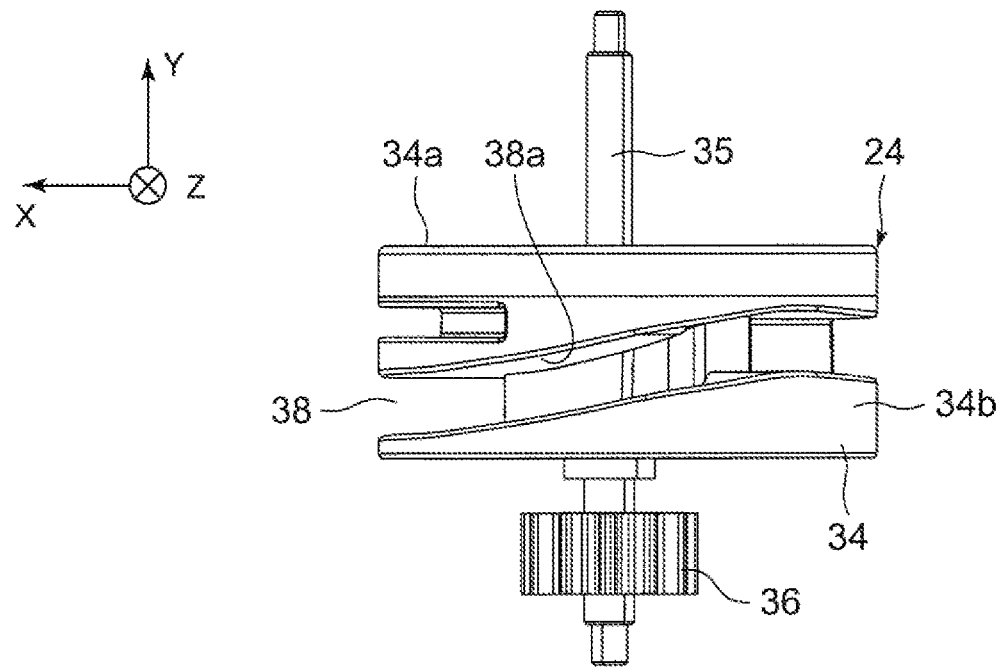
FIG. 8E is a bottom view of the cam member.
Figure 9:
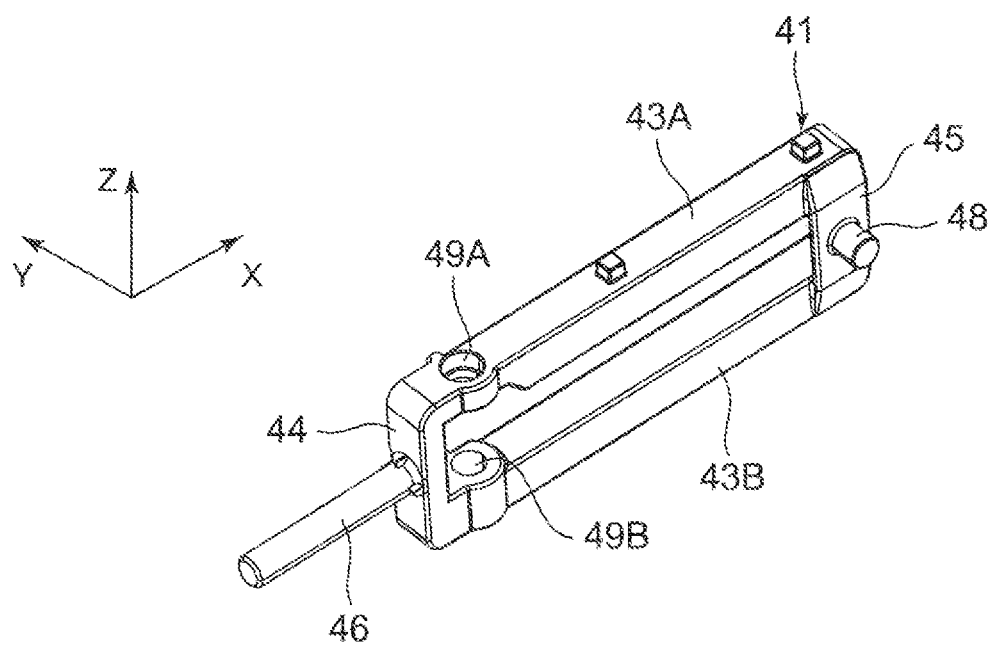
FIG. 9 is a perspective view of a linear motion link.
Figure 10:
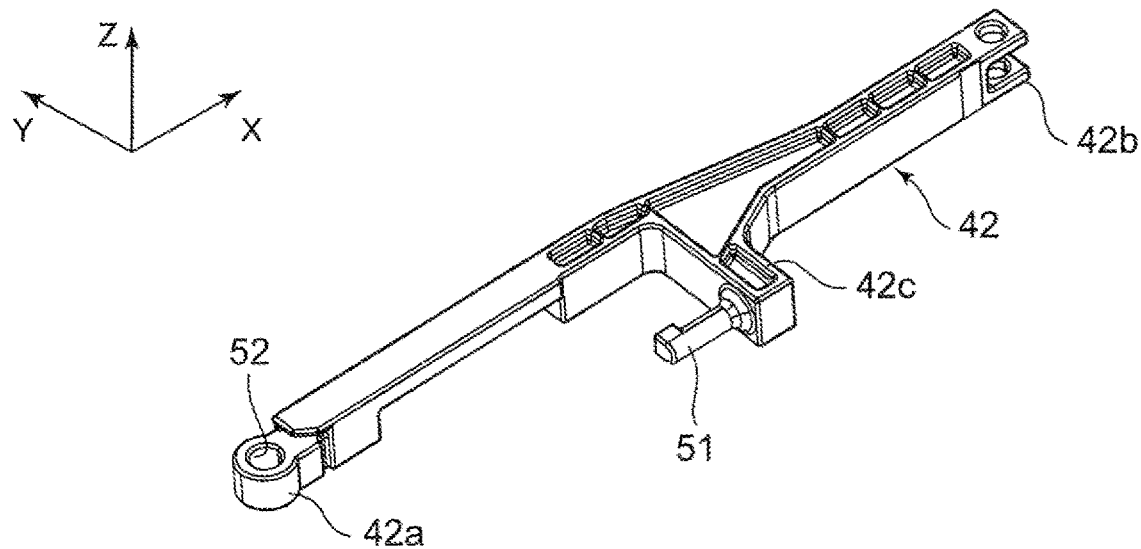
FIG. 10 is a perspective view of a pivot link.

The rack 23 can linearly move along a guide groove 31 which is defined by an inner surface of the body 21A and a rack cover 29 (see arrows C1 and C2 of FIGS. 6A and 6B). The guide groove 31, i.e., a locus along which the rack 23 linearly moves is included in an XZ plane and inclines with respect to the X direction. The inner cable 8*b* is connected to a base end of the rack 23. A spring 32 is arranged between the base end of the rack 23 and an end wall of the guide groove 31. The spring 32 elastically urges the rack 23 in the +X direction.

The cam member 24 includes a cam body 34 and a rotary shaft 35 fixed to the cam body 34. The rotary shaft 35 is rotatably supported by the housing 22 in a manner where the rotary shaft 35 extends in the Y direction (arrows R1 and R2 in FIG. 8A). A pinion 36 is fixed to the rotary shaft 35. As most clearly shown in FIGS. 7A and 7B, the pinion 36 meshes with the rack 23. By this meshing state between the rack 23 and the pinion 36, the linearly movement of the rack 23 is converted into rotation movement of the cam body 34 around the rotary shaft 35 (i.e., engagement of the rack 23 and pinion 36 converts an opening and closing movement of the vehicle door 2 transmitted through the cable 8 into rotational movement of the cam member 24).

Further referring to FIGS. 8A to 8E, a first cam groove (first cam portion) 37 is formed in a side surface 34*a* (first surface) of the cam body 34 which is opposite from the pinion 36. Further, a second cam groove (second cam portion) 38 is formed on a circumferential surface 34*b* (second surface) of the cam body. That is, the first cam groove 37 is formed on the surface of the cam body 34 intersecting orthogonally with the rotary shaft 35, whereas the second cam groove 38 is formed on the surface of the cam body 34 which is parallel to the rotary shaft 35. A first cam follower 48 provided on a later-described linear motion link 41 is engaged with the first cam groove 37. A second cam follower 51 provided on the later-described pivot link 42 is engaged with the second cam groove 38. Details of the first cam groove 37 and the second cam groove 38 will be described later.

With reference to FIGS. 4 to 6*b*, and 9 to 10, the link mechanism 25 of this embodiment includes the linear motion link 41 and the pivot link 42.

The linear motion link 41 includes linear motion arms 43A and 43B arranged at a distance from each other in the Z direction and extending in the Y direction. As most clearly shown in FIG. 9, base ends of the linear motion arms 43A and 43B are connected to each other through a first connecting portion 44, and tip ends of the arms 43A and 43B are connected to each other through a thin second connecting portion 45.

The second connecting portion 44 is provided with a straight rod portion 46 projecting in the −X direction. The rod portion 46 is accommodated in a base end 21*c* (see FIG. 4) of the body 21B of the housing 22 in a state where the rod portion 46 can linearly move in the X direction. Hence, the entire linear motion link 41 can linearly move in the X direction (see arrows D1 and D2 in FIGS. 6A and 6B). A spring 47 is attached to the rod portion 46. One end of the spring 47 abuts against the second connecting portion 44 and the other end abuts against the base end 21*c*. The spring 47 elastically urges the linear motion link 41 in the +X direction. The second connecting portion 44 is provided with a first cam follower 48 projecting in the −Y direction. As will be described in detail later, the linear motion link 41 linearly moves in the X direction (longitudinal direction of vehicle door 2) in accordance with rotation of the cam member 24 by engagement between the first cam groove 37 of the cam member 24 and the first cam follower 48. Portions of the linear motion arms 43A and 43B adjacent to the first connecting portion 44 are formed with mounting holes 49A and 49B.

The pivot link 42 substantially straightly extends from a base end 42*a* to the tip end 42*b* in the X direction. A central portion of the pivot link 42 in the longitudinal direction is provided with a branched portion 42*c* projecting in the −Y direction. A tip end of the branched portion 42*c* is provided with the second cam follower 51. The second cam follower 51 projects from the branched portion 42*c* in the −X direction. A bearing hole 52 is formed in the base end 42*a* of the pivot link 42. The protector 28 is fixed to the tip end 42*b* of the pivot link 42 as described above.

Figure 11:
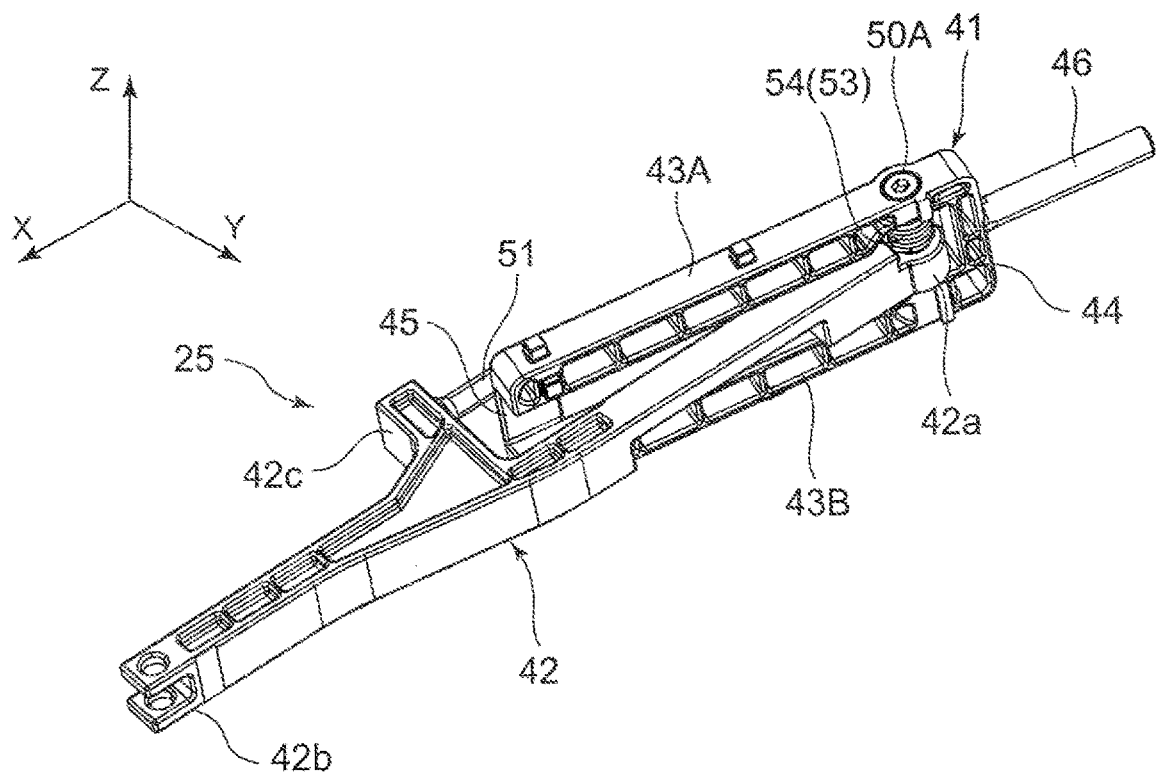
FIG. 11 is a perspective view of the linear motion link and the pivot link.

As most clearly shown in FIG. 11, the pivot link 42 is connected to the linear motion link 41 so that the pivot link 42 can pivotally move in the Y direction (width direction of vehicle door 2) in an XY plane. As most clearly shown in FIG. 4, both ends of a pivot pin 53 extending in the Z direction are accommodated in the mounting holes 49A and 49B and are fixed to the linear motion arms 43A and 43B by means of screws 50A and 50B. The pivot pin 53 is inserted into the bearing hole 52 of the pivot link 42. Hence, the pivot link 42 can pivotally move around the pivot pin 53 (see arrows E1 and E2 of FIG. 6B). A spring 54 attached to the pivot pin 53 has one end engaged with the pivot link 42 and the other engaged with the linear motion link 41, and thereby elastically urges the pivot link 42 in a direction shown by the arrow E1, i.e. in a direction where the protector 28 is pivoted to the Y direction. The second connecting portion 45 of the linear motion link 41 limits a pivot movement angle of the pivot link 42 against the urging force of the spring 54 for avoiding interference of the pivot link 42.

As most clearly shown in FIGS. 6A and 6B, the link mechanism 25, i.e., the linear motion link 41 and the pivot link 42 connected thereto are arranged in adjacent to the cam member 24 in the +Y direction. Further, as conceptually shown by a reference sign β1 in FIG. 6B, in this embodiment, the pivot pin 53 (a pivot center of the pivot link 42) is provided at a position relatively away from the rotary shaft 35 (a rotation center of the cam body 34). The first cam follower 48 of the linear motion link 41 projecting in the −Y direction is engaged with the first cam groove 37 formed in the side surface 34*a* of the cam body 34. As shown in FIG. 8A, the spring 47 elastically urges the linear motion link 41 in the +X direction. According to this, the first cam follower 48 comes into contact with one of groove side surfaces 37*a* of the first cam groove 37. As shown by a broken line F in FIG. 8A, the first cam follower 48 moves in the first cam groove 37 in an interlocking manner with rotation of the cam member 24. According to this, rotation movement of the cam member 24 is converted into linear movement in the X direction.

The second cam follower 51 of the pivot link 42 is engaged with the second cam groove 38 formed in a side surface 34*a* of the cam body 34. The spring 54 elastically urges the pivot link 42 so that the second cam follower 51 comes into contact with one of groove side surface 38*a* of the second cam groove 38 as conceptually shown in FIG.

8D. As apparent from FIGS. 8A to 8E, a position of the groove side surface 38a in the Y direction differs depending upon a position of the second cam groove 38. Hence, rotation movement of the cam body 34 is converted into pivot movement of the pivot link 42 in the Y direction (pivot movement around pivot pin 53).

Operation of the door edge protector device 1 of this embodiment will be described below.

Figure 5:
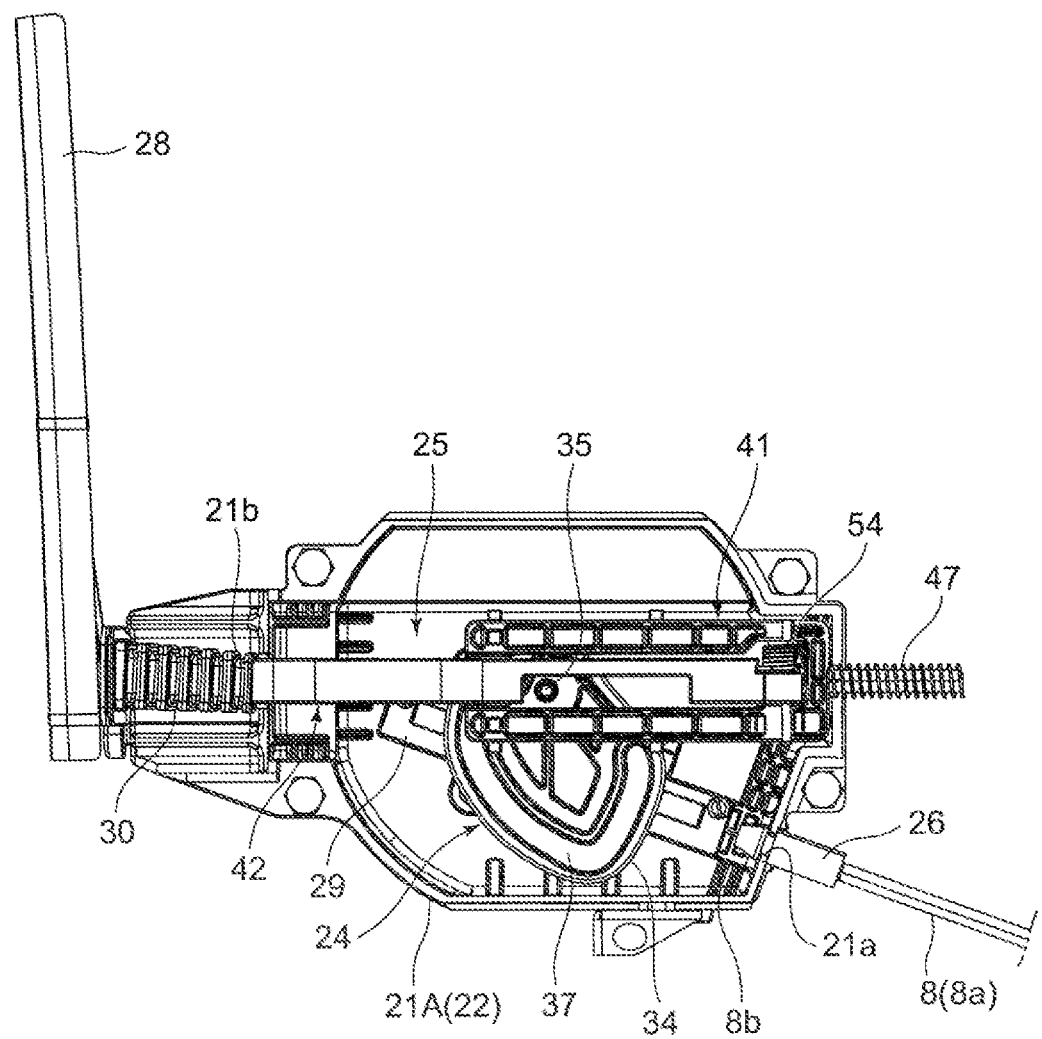
FIG. 5 is a front view of the output unit in with a housing is an open state.

FIGS. 5 to 6B show states of the rack 23 of the output unit 7, the cam member 24, and the link mechanism 25 in the close state of the vehicle door 2, i.e., in a state where the input unit 6 pulls the inner cable 8b thereinto. If the vehicle door 2 is pivoted around the pivot shaft S from the close state to the open state, the input unit 6 sends out the inner cable 8b toward the output unit 7. The spring 32 urges the rack 23, and the spring 47 urges the linear motion link 41. Hence, when the inner cable 8b is sent out toward the output unit 7, the lack 23 linearly moves in a direction of an arrow C1 of the rack 23, and the cam member 24 rotates in a direction of an arrow R1. As a result, the first cam follower 48 moves relative to the cam member 24 along the first cam groove 37 as shown by an arrow G1 in FIG. 8A, and the second cam follower 51 also move relative to the cam member 24 along the second cam groove 38.

By the movement of the first cam follower 48 relative to the cam member 24, linear motion link 41 linearly moves in the X direction (arrows D1 and D2 in FIG. 6B). A moving amount of the linear motion link 41 changes in accordance with a rotation angle of the cam member 24. By the movement of the second cam follower 51 relative to the cam member 24, pivot movement of the pivot link 42 around the pivot pin 53 is generated (arrows E1 and E2 in FIG. 6B). A pivot movement amount of the pivot link 42 changes in accordance with a rotation angle of the cam member 24. In accordance with a sum of the moving amount of the linear motion link 41 and the pivot movement amount of the pivot link 42, a position of the protector 28 relative to the vehicle door 2 is changed. Specifically, movement of the protector 28 in the Y direction corresponding to a pivoting angle of the vehicle door 2 is given by the linear motion link 41, and movement of the protector 28 in the X direction corresponding to the pivoting angle of the vehicle door 2 is given by the pivot link 42. In other words, the protector 28 moves along a locus T (see FIG. 13) which is determined by superimposition of the moving amount of the linear motion link 41 and the pivot movement amount of the pivot link 42.

When the vehicle door 2 is pivoted around the pivot shaft S from the close state to the open state, the inner cable 8b is pulled into the input unit 6. If the inner cable 8b is pulled into the input unit 6, the rack 23 linearly moves in a direction of an arrow C2, and the cam member 24 rotates in a direction of an arrow R2 by driving motion caused by this linear motion. As a result, the protector 28 moves on the locus T in a direction opposite to the case where the vehicle door 2 pivots from the close state to the open state.

Figure 12:
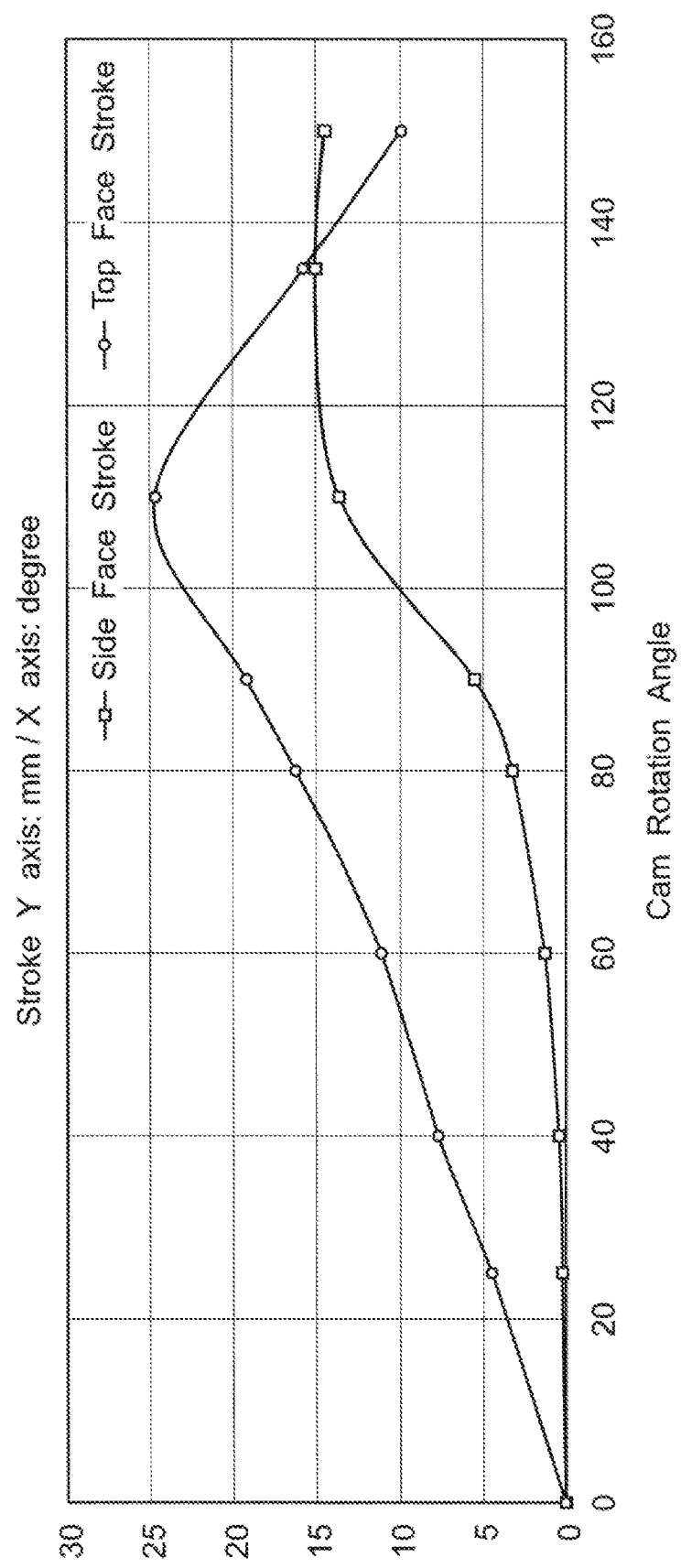
FIG. 12 is a graph showing a relation between a cam rotation angle and displacements (strokes) of the linear motion link and the pivot link.
Figure 13:
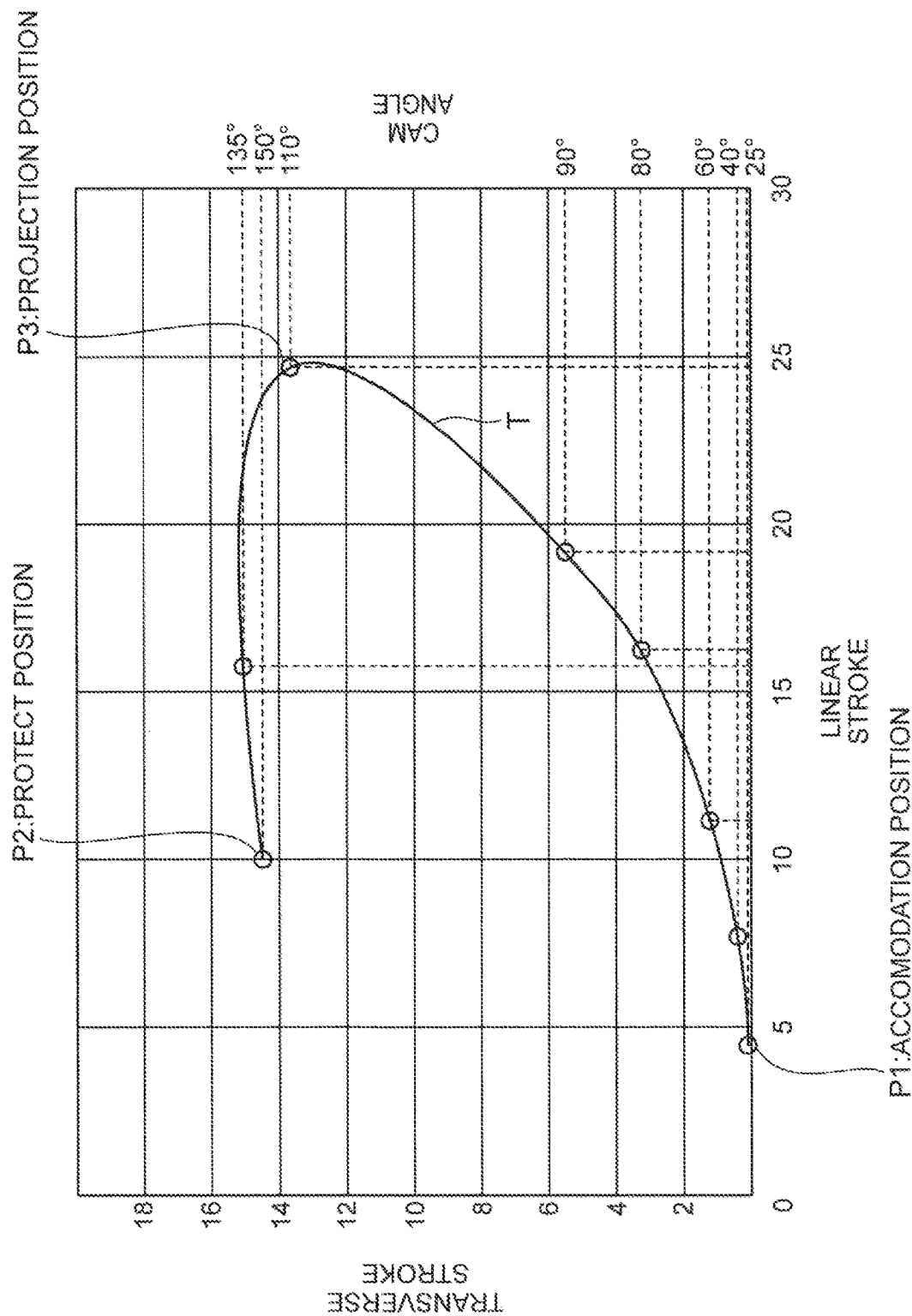
FIG. 13 is a graph showing a relation between the cam rotation angle and a displacement (stroke) of a protector.
Figure 14A:
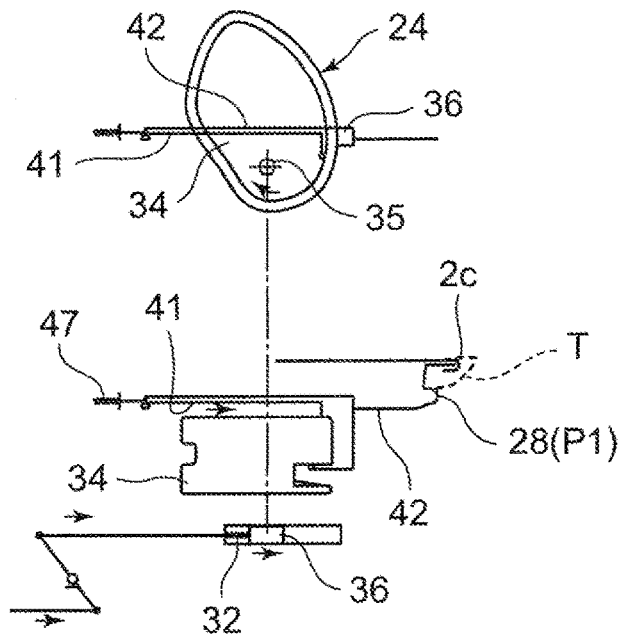
FIG. 14A is a schematic diagram showing a relation between the cam rotation angle and the displacement of the protector (rotation angle of cam member is 0°)
Figure 14B:
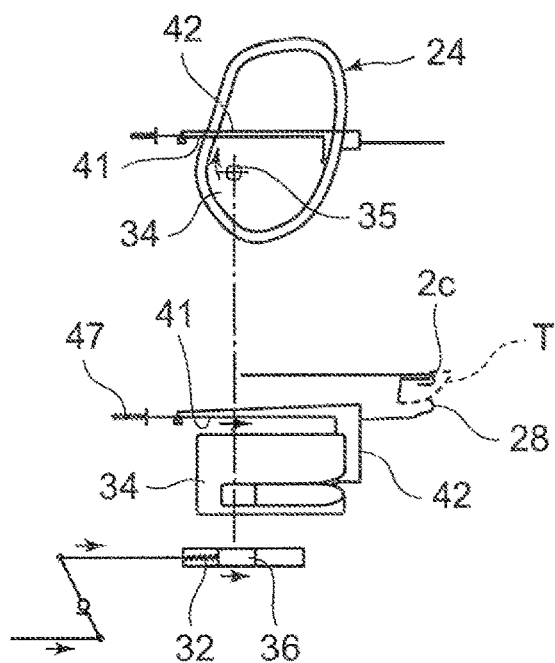
FIG. 14B is a schematic diagram showing the relation between the cam rotation angle and the displacement of the protector (rotation angle of cam member is 60°)
Figure 14C:
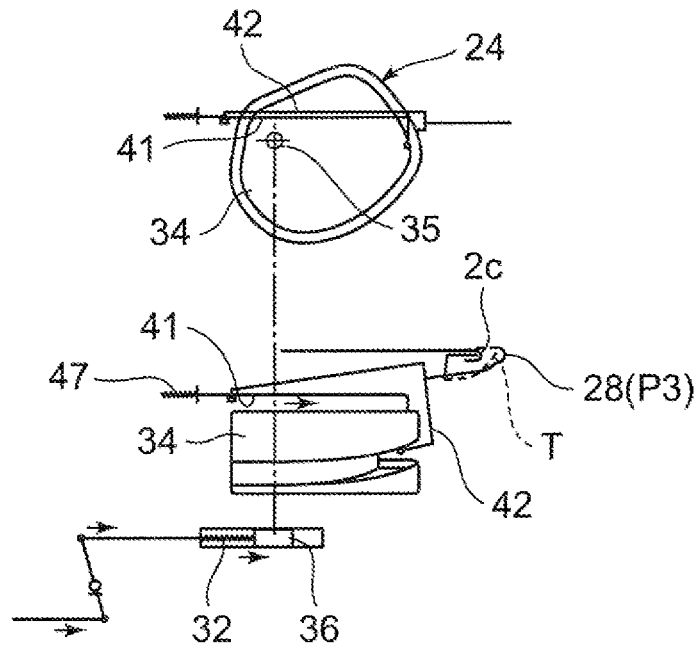
FIG. 14C is a schematic diagram showing the relation between the cam rotation angle and the displacement of the protector (rotation angle of cam member is 110°)
Figure 14D:
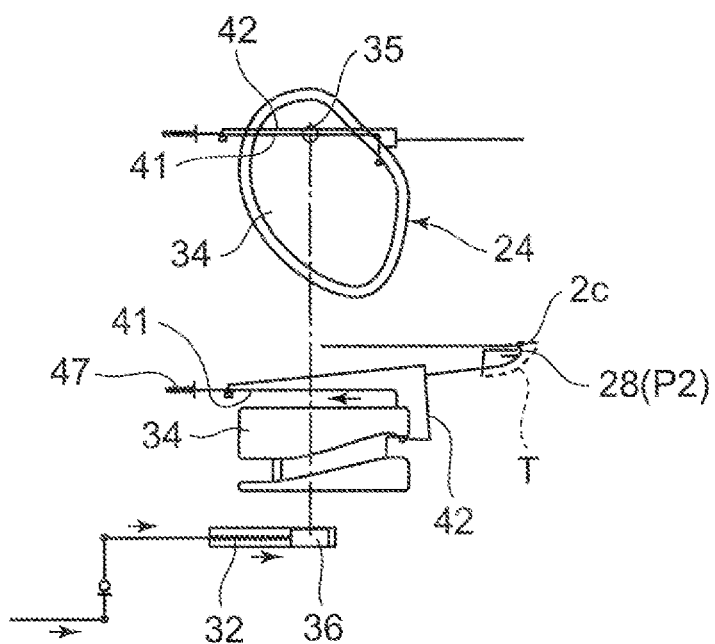
FIG. 14D is a schematic diagram showing the relation between the cam rotation angle and the displacement of the protector (rotation angle of cam member is 150°)

FIG. 12 shows variation of a position of the protector 28 in the Y direction with respect to a rotation angle of the cam member 24 (referred to as top face stroke in FIG. 12), and a position of the protector 28 in the X direction (referred to as side face stroke in FIG. 12). FIG. 13 shows the locus T of the protector 28. In FIG. 13, a position of the protector 28 in the Y direction is called a linear stroke, and a position of the protector 28 in the Z direction is referred to as a traverse stroke. The locus T in FIG. 13 can be obtained by superposing the top face stroke and the side face stroke in FIG. 12 on each other.

With reference to FIGS. 13 and 14A to 14D, the locus T includes an accommodated position P1 where the protector 28 located to a position corresponding to the close state of the vehicle door 2 as well a set position P2 corresponding to the close state of the vehicle door 2. In the set position P2, the protector 28 covers the door edge 2c. In the accommodated position P1, the protector 28 is in a position shown in FIG. 1, and the protector 28 does not interfere with the vehicle body 3 although the vehicle door 2 is in the close state. In the set position P2, as conceptually shown in FIG. 4D, the protector 28 covers and protects the door edge 2c. As conceptually shown in FIG. 13C, the locus T includes a projecting position P3 between the accommodated position P1 and the set position P2. The projecting position P3 projects further than the door edge 2c in the longitudinal direction of the vehicle door 2 and is located inwardly further than the door edge 2c in the width direction of the vehicle door. When the protector 28 moves from the projecting position P3 to the set position P2, the protector 28 once slightly moves outward of the vehicle door 2 in the width direction while retracting in the longitudinal direction of the vehicle door 2, and then the protector 28 moves slightly inward in the width direction of the vehicle door 2 while retracting in the longitudinal direction of the vehicle door 2. In other words, when the protector 28 moves from the projecting position P3 to the set position P2, the protector 28 once slightly moves in the +Y direction while moving in the −X direction, and then the protector 28 slightly moves in the −Y direction while moving in the −X direction.

According to the door edge protector device 1 of the present embodiment, the locus T on which the protector 28 moves can be changed by changing shapes of the first cam groove 37 and the second cam groove 38 formed in the cam member 24. Hence, the door edge protector device 1 can be applied to difference vehicle types having different thickness and shape of the vehicle door 2 by changing only the cam member 24 without changing the link mechanism 25.

When the protector 28 projects from the accommodated position P1 to the set position P2, the link mechanism 25 can smoothly be moved by urging forces of the springs 32, 47, and 54 in accordance with opening movement of the vehicle door 2, and the protector 28 can reliably move to the set position P2. When the vehicle door 2 is closed, the inner cable 8b is pulled into the input unit 6 in an interlocking manner with the closing movement of the vehicle door 2. According to this pulling movement, the rack 23, the cam member 24, and the link mechanism 25 can forcibly be moved. Hence, the protector 28 can be moved to the accommodated position P1 without delaying the closing movement of the vehicle door 2.

By providing the single cam member 24 with the two cam portions, i.e., the first cam groove 37 and the second cam groove 38, it is possible to achieve the movement of the protector 28 in the interlocking manner with the close/open movement of the vehicle door 2 while suppressing the number of parts to the minimum.

Second Embodiment

Figure 15:
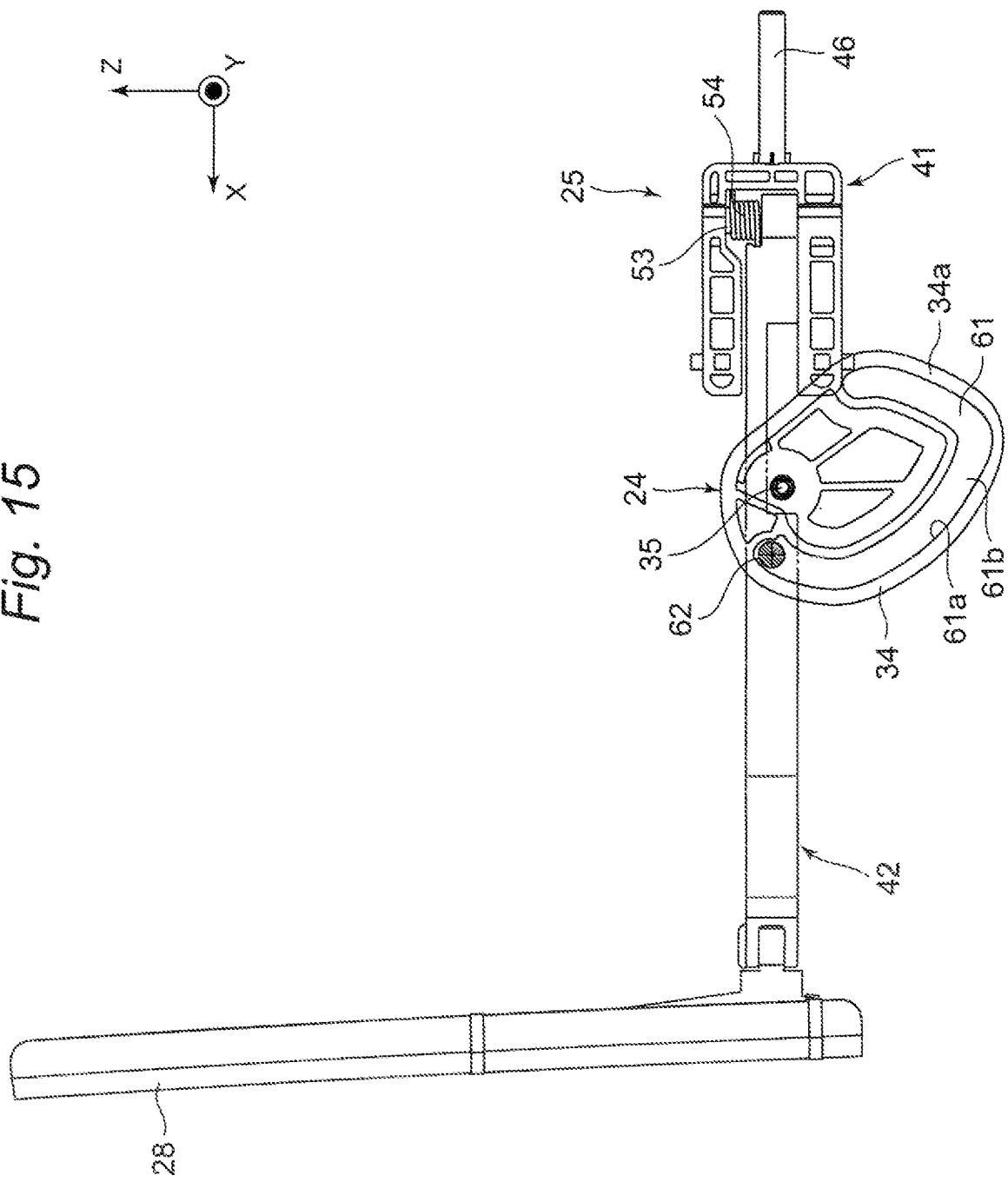
FIG. 15 is a front view of a cam member and a link member of a door edge protector device according to a second embodiment of the present invention.
Figure 16:
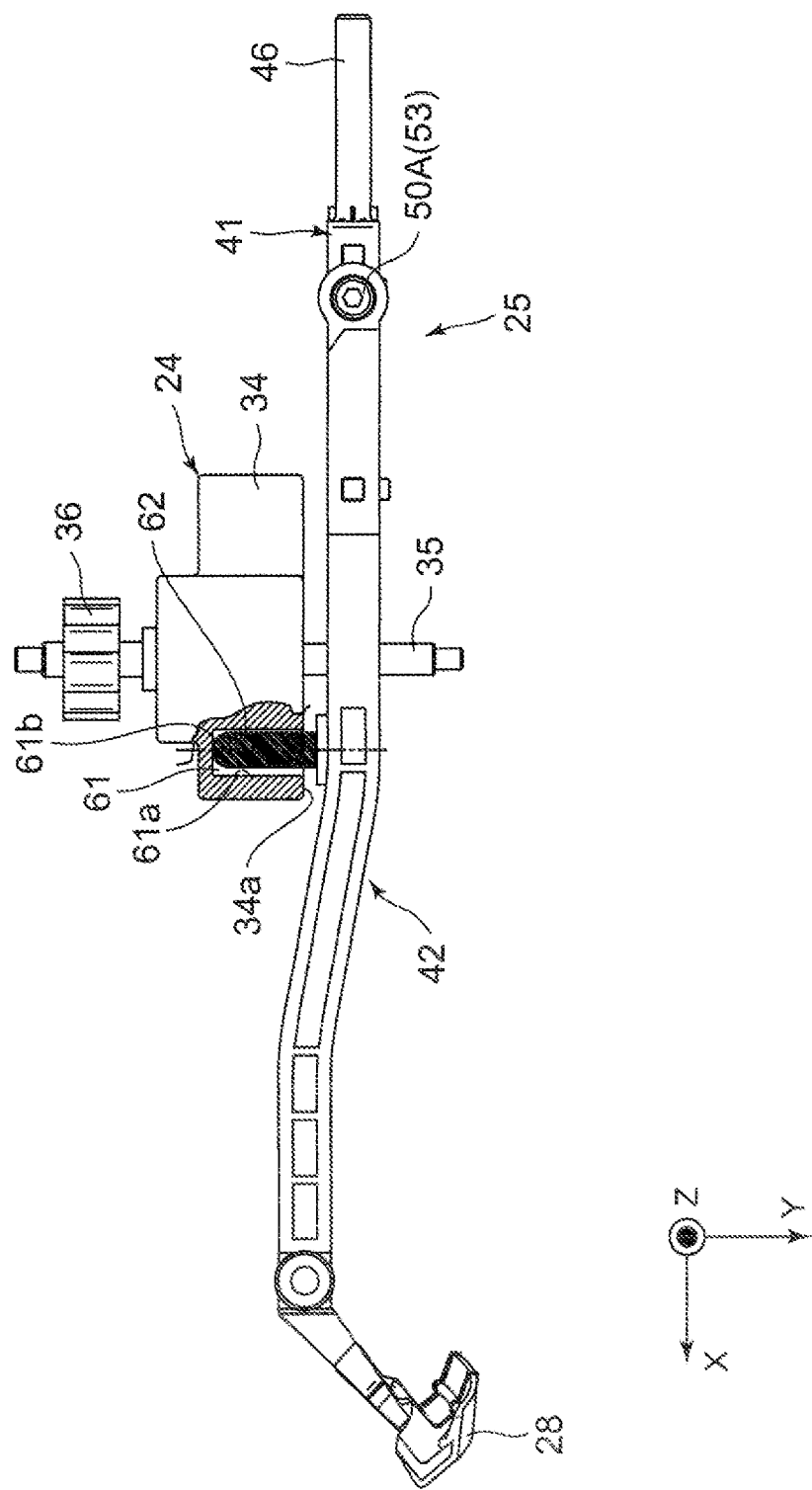
FIG. 16 is a plan view of the cam member and the link member.

FIG. 15 shows a second embodiment of the present invention. In the second embodiment, configurations of the input unit 6 and the cable 8 (see FIG. 2 for example) are the same as those of the first embodiment. Configurations and movements which are not especially mentioned are the same as those of the first embodiment.

The cam body 34 of the cam member 24 of the second embodiment includes a single cam groove 61 (cam portion) formed in the side surface 34a. The linear motion link 41 of the link mechanism 25 is not provided with a cam follower (see reference sign 48 in FIG. 9). The pivot link 42 of the link mechanism 25 is provided with a single cam follower 62 which projects in the −Y direction.

Figure 17:
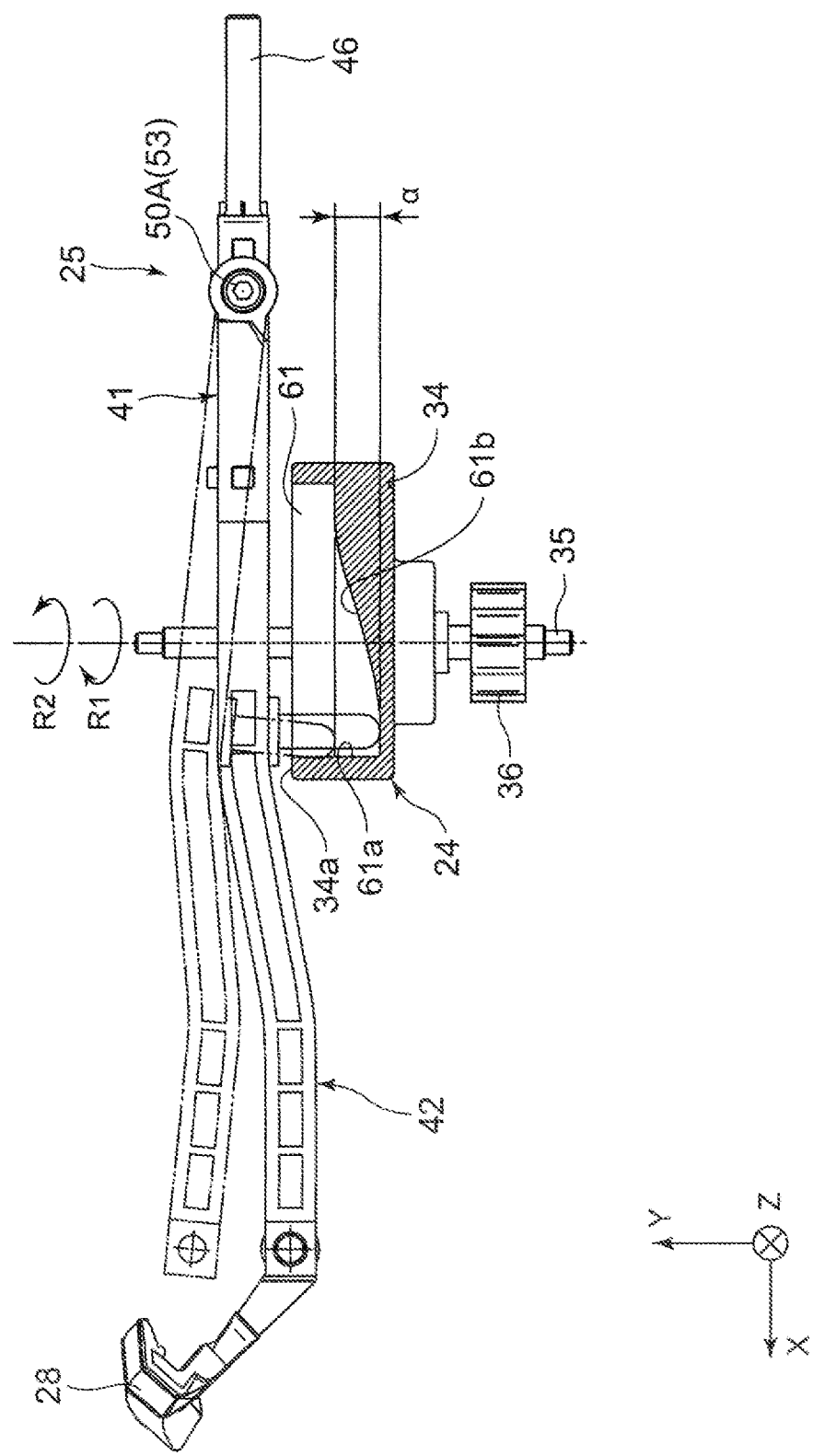
FIG. 17 is a bottom view of the cam member and the link member.
Figure 18:
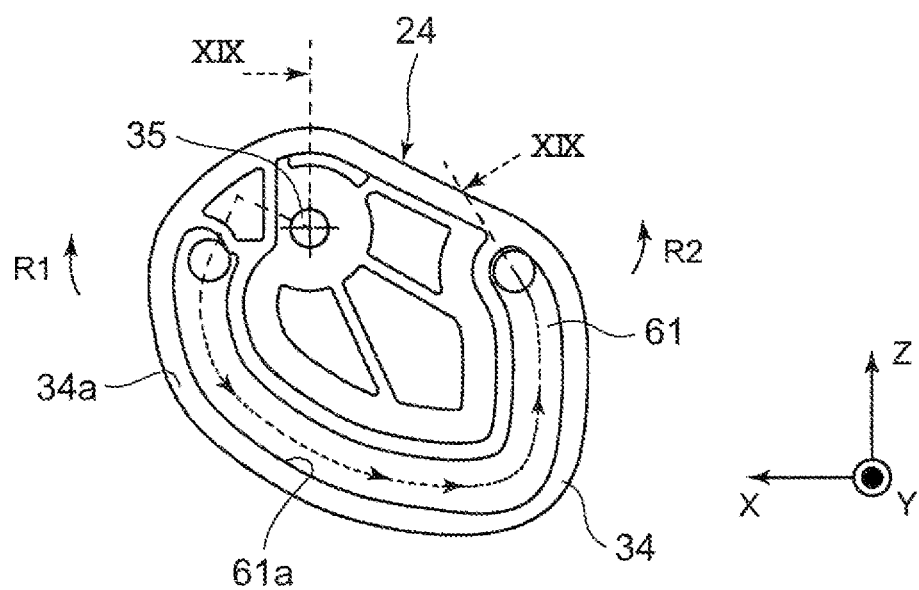
FIG. 18 is a front view of the cam member.

The cam follower 62 is engaged with the cam groove 61. The cam follower 62 comes into contact with one of groove side surfaces 61a (first cam surface) of the cam groove (groove) 61. The groove side surface 61a defines movement of the protector 28 in the X direction by the link mechanism 25. In other words, the groove side surface 61a of the cam groove 61 in the second embodiment corresponds to the groove side surface 37a of the first cam groove 37 in the first embodiment. A reference sign α shows a moving amount of the protector 28 in the Y direction in FIG. 17.

Figure 19:
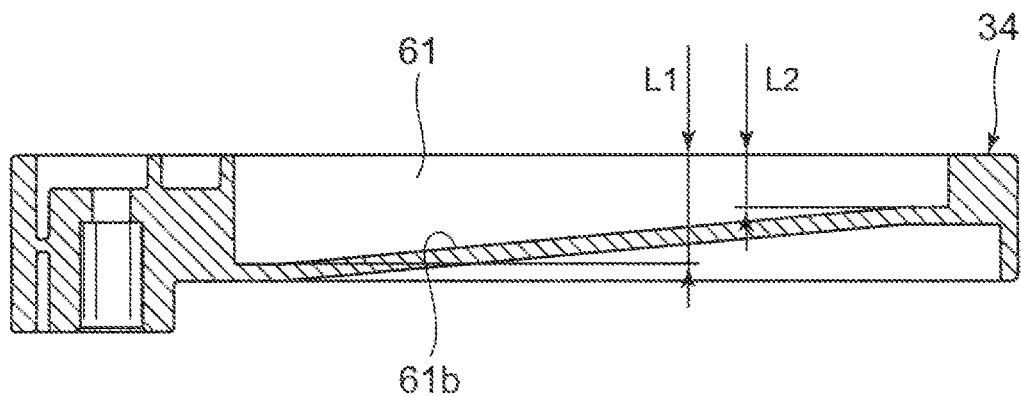
FIG. 19 is a sectional view taken along a line XIX-XIX in FIG. 18.
Figure 20:
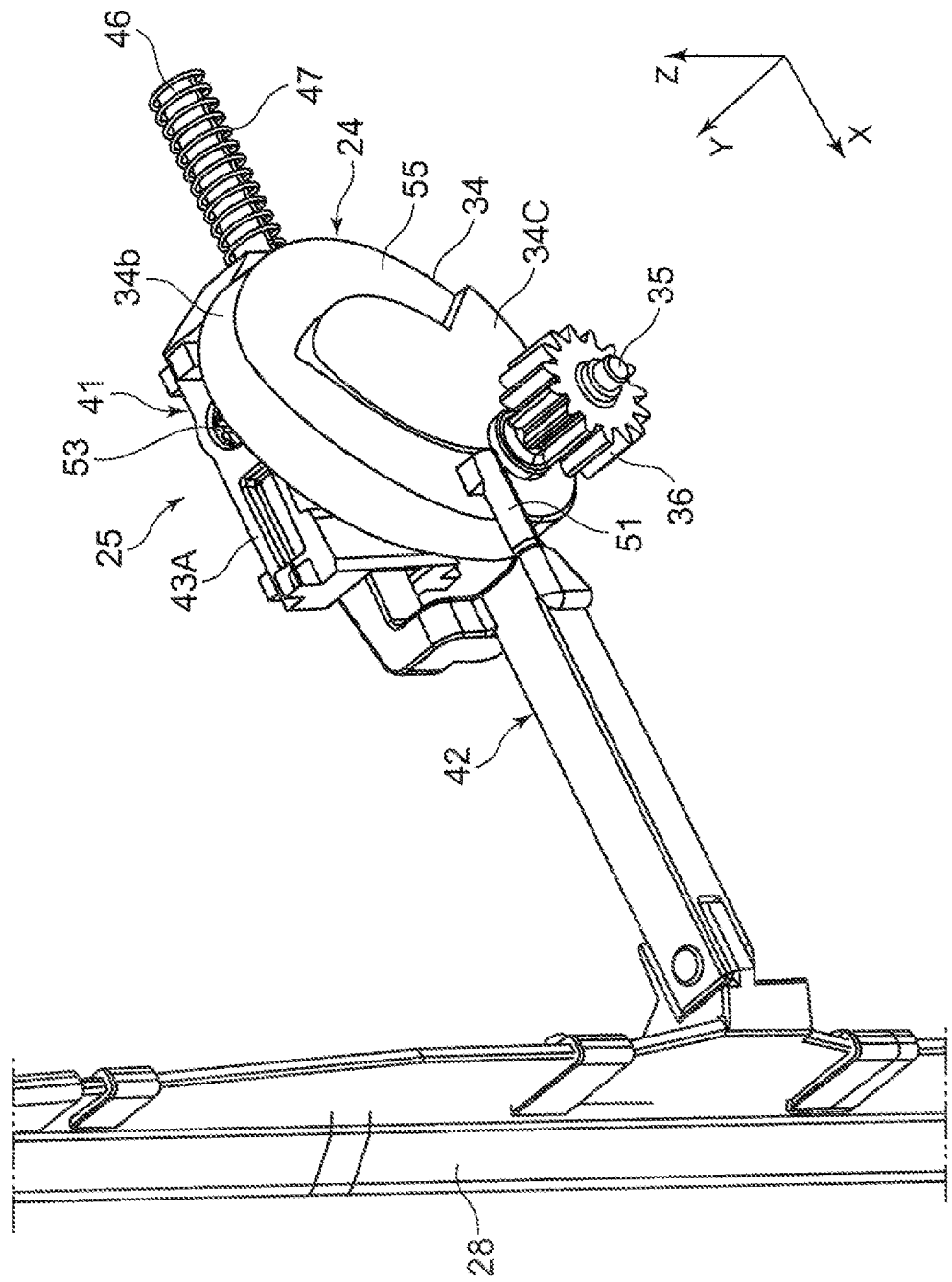
FIG. 20 is a perspective view of an internal mechanism of an output unit of a door edge protector device according to a third embodiment of the present invention.

The cam follower 62 also comes into contact with a groove bottom wall surface 61b (second cam surface) of the cam groove 61. The bottom wall surface 61b is adjacent to the groove side surface 37. The groove bottom wall surface defines movement of the protector 28 in the Y direction by the link mechanism 25. In other words, the groove bottom wall surface 61b of the cam groove 61 in the second embodiment corresponds to the groove side surface 38a of the second cam groove 38 in the first embodiment. A moving amount of the protector 28 in the X direction is a difference (L1−L2) between a length L1 and a length L2 in FIG. 19.

Third Embodiment

FIGS. 20 to 23B show a third embodiment of the present invention. In this embodiment, configurations of the input unit 6 and the cable 8 (see FIG. 2 for example) are the same as those of the first embodiment. Configurations and movements which are not especially mentioned are the same as those of the first embodiment.

Figure 22:
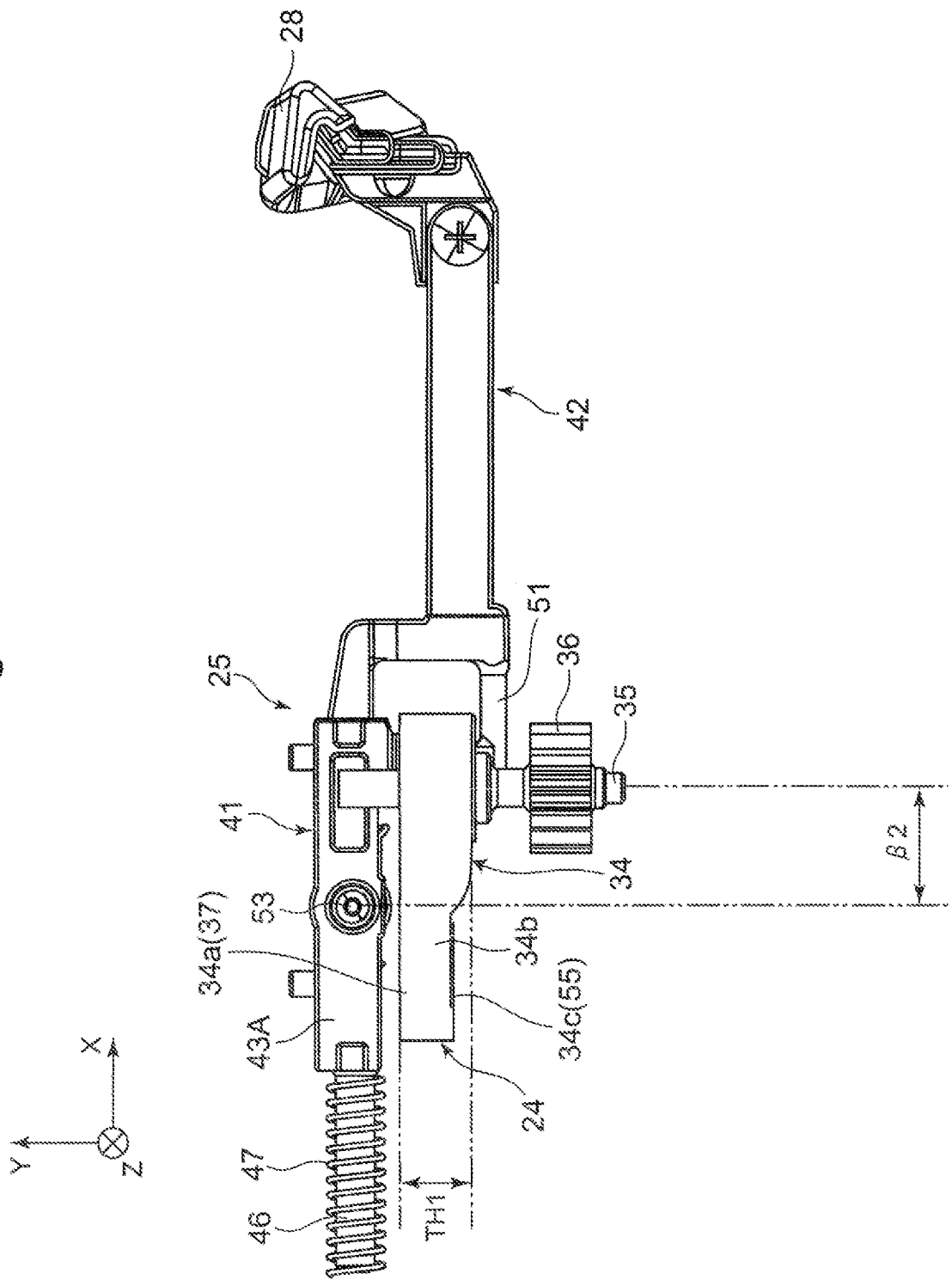
FIG. 22 is a bottom view of the output unit.
Figure 23A:
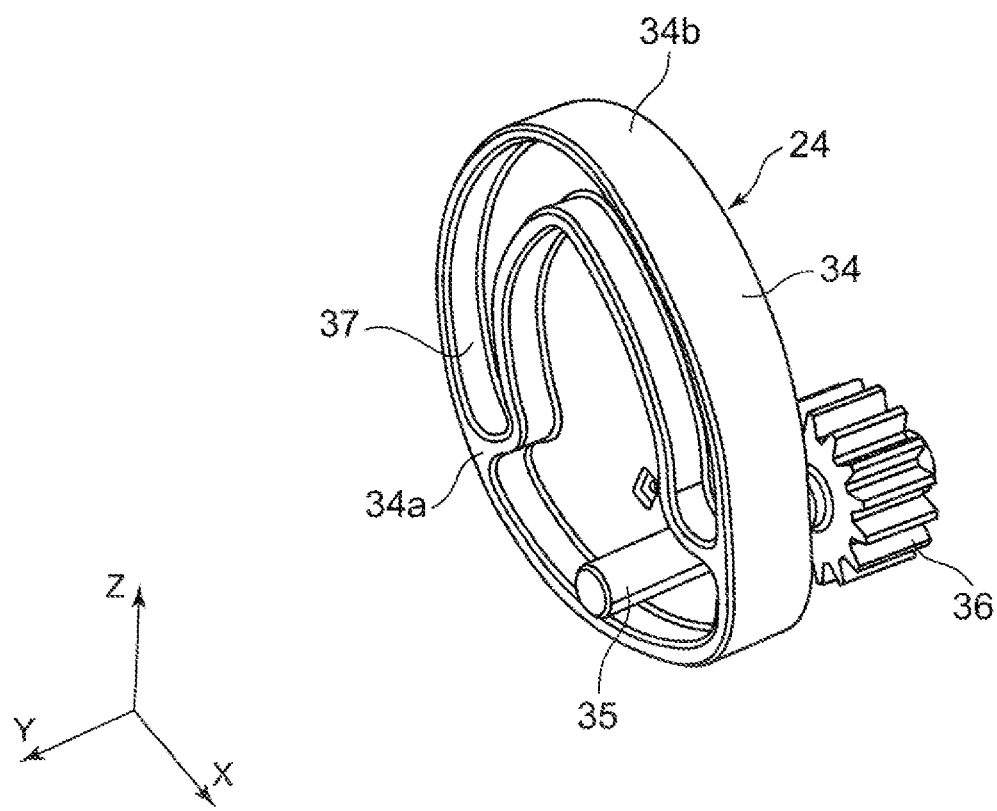
FIG. 23A is a perspective view of a cam member.
Figure 23B:
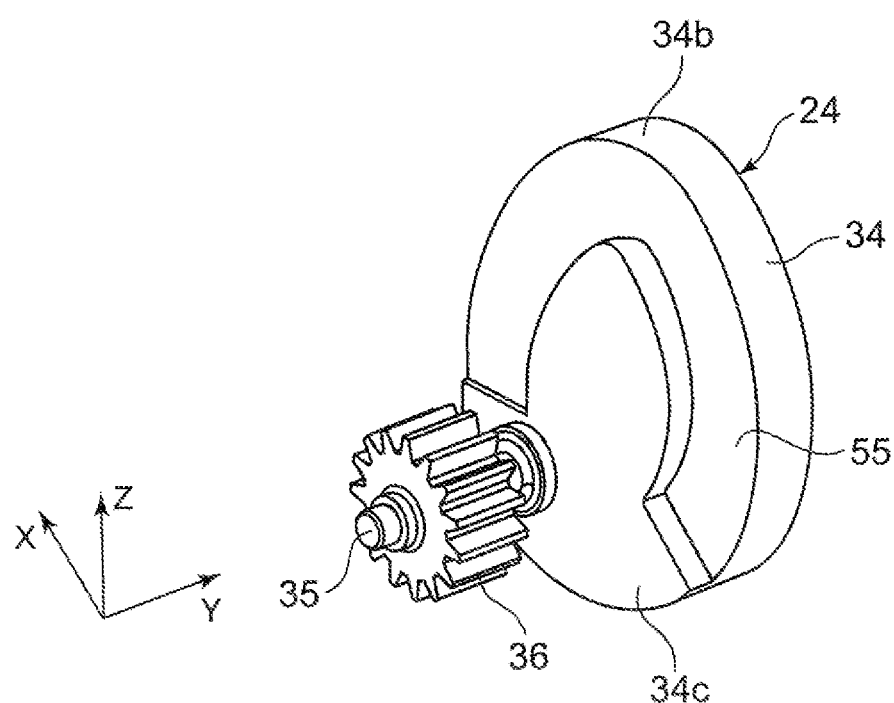
FIG. 23B is a perspective view of the cam member shown from another angle.

As conceptually shown by a reference sign β2 in FIG. 22, in this embodiment, the pivot pin 53 (the pivot center of the pivot link 42) is provided at a position relatively near to the rotary shaft 35 (the rotation center of the cam body 34) in the −X direction (also see the reference sign β1 in FIG. 6B). This arrangement of the pivot pin 53 reduces a size of the output unit 7 in the X direction.

The cam body 34 of this embodiment is not formed with the second cam groove 38 (see FIGS. 8A to 8E for example). Instead of the cam groove 38, the cam body 34 is formed with a cam surface 55 on a side surface (third surface) 34c opposed to the side surface (first surface) on which the first cam groove 37 is formed. The spring 54 elastically urges the pivot link 42 so that the second cam follower 51 of the pivot link 42 comes into contact with the cam surface 55. For example, as clearly understood by referring to FIG. 23B, a position of the cam surface 55 in the Y direction differs depending upon a position on the cam surface 55 (angular position about the rotary shaft 35). Therefore, the rotational movement of the cam body 34 is converted to the pivot movement in the Y direction of the pivot link 42 by the cam surface 55 and the second cam follower 51.

As clearly understood by comparing a reference sign TH1 in FIG. 22 with a reference sign TH2 in FIG. 8B, providing the cam surface 55 formed on the side surface 34c, instead of providing the second cam groove 38 formed on the circumferential surface 34b, reduces a thickness of the cam body 34 in this embodiment. This configuration of the cam body 34 can reduce a size of the output unit 7 in the Y direction.

As described above, in this embodiment, the arrangement of the pivot pin 53 as well as the configuration of the cam body 34 downsize the output unit 7.

Fourth Embodiment

Figure 24:
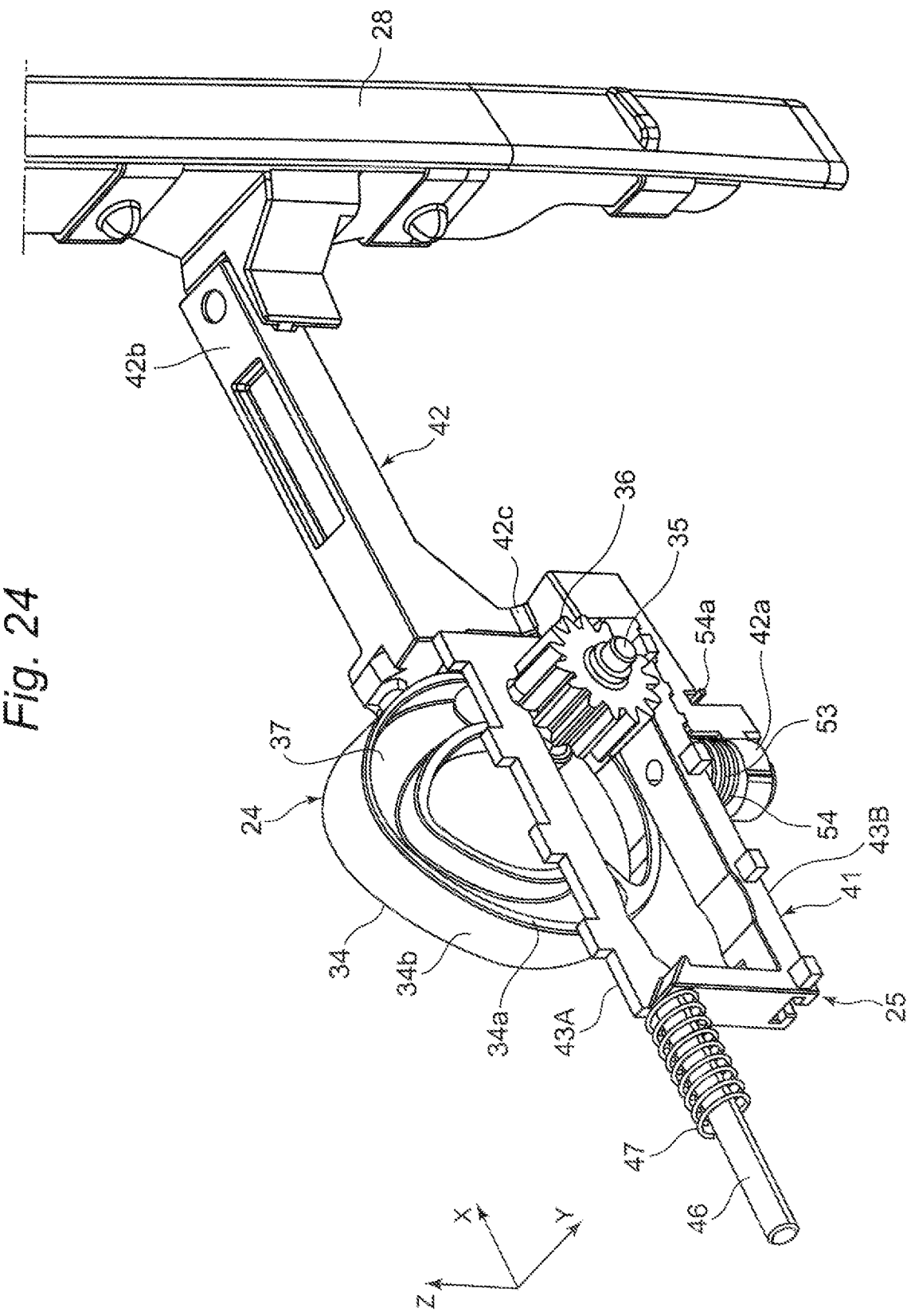
FIG. 24 is a perspective view of an output unit of a door edge protector device according to a fourth embodiment of the present invention.
Figure 25:
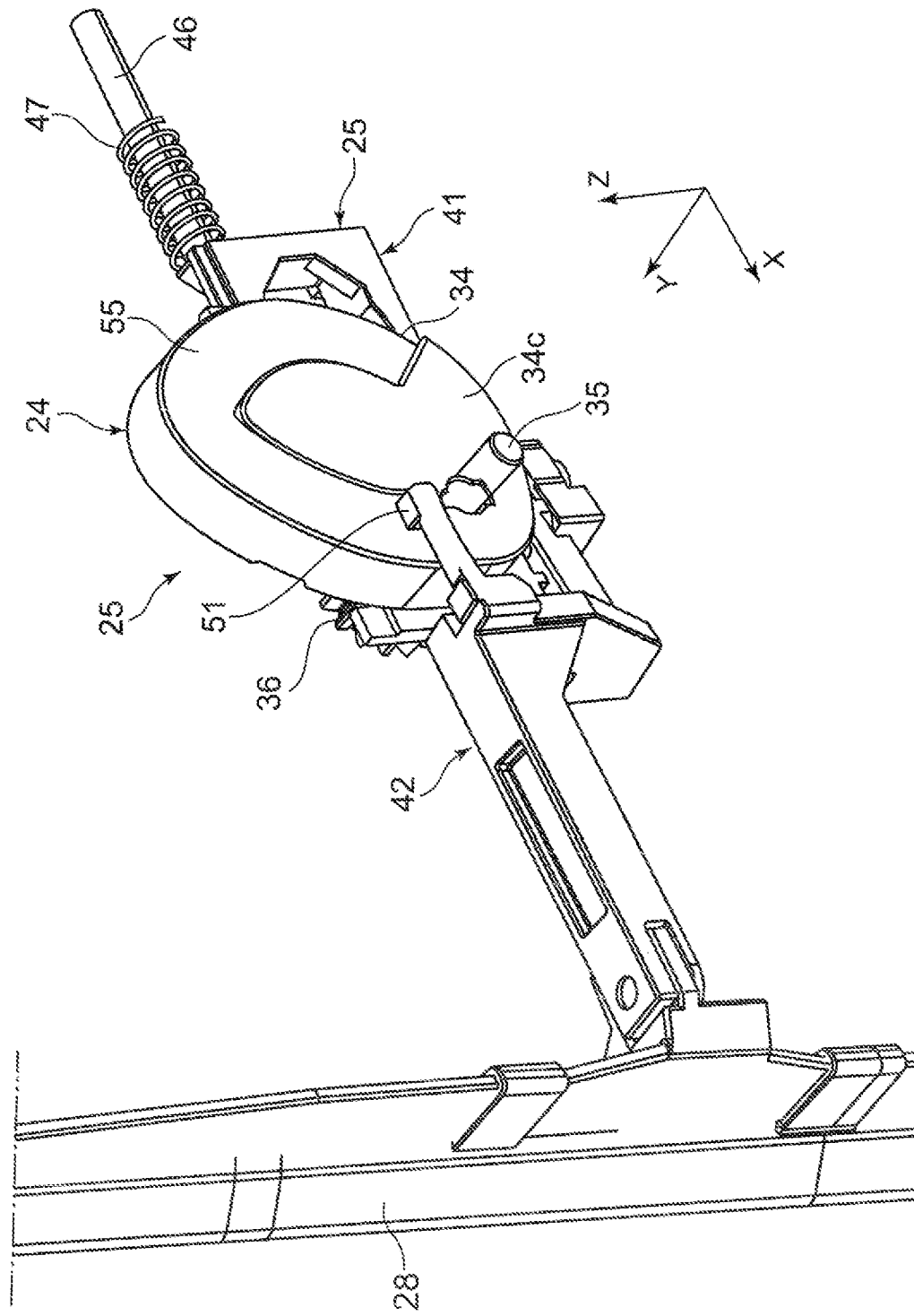
FIG. 25 is a perspective view of the output unit shown from another angle.
Figure 26:
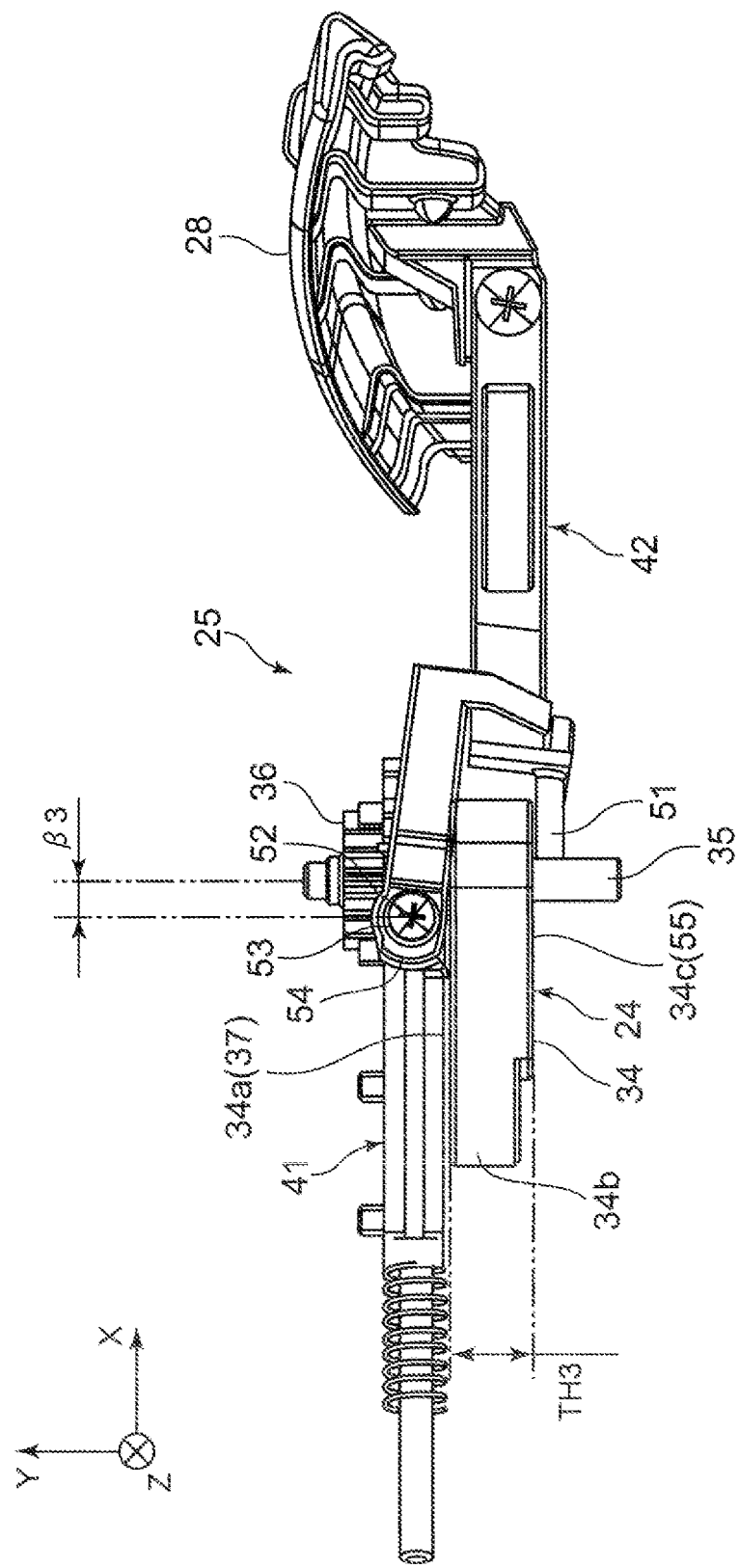
FIG. 26 is a bottom view of the output unit.

FIGS. 24 to 26 show a fourth embodiment of the present invention. n this embodiment, configurations of the input unit 6 and the cable 8 (see FIG. 2 for example) are the same as those of the first embodiment. Configurations and movements which are not especially mentioned are the same as those of the first embodiment.

Similarly to the third embodiment, the pivot pin 53 (the pivot center of the pivot link 42) is provided at a position relatively near to the rotary shaft 35 (the rotation center of the cam body 34) in the −X direction (see the reference sign β3 in FIG. 26). This arrangement of the pivot pin 53 reduces the size of the output unit 7 in the X direction.

Similarly to the third embodiment, the cam body 34 is formed with the cam groove 37 on the side surface (first surface) 34a and the cam surface 55 on the side surface (third surface) 34c opposed to the side surface 34a. The spring 54 elastically urges the pivot link 42 so that the second cam follower 51 of the pivot link 42 comes into contact with the cam surface 55. This arrangement can reduce the thickness of the cam body 34, and thereby can reduce the size of the output unit 7 in the Y direction.

Figure 21:
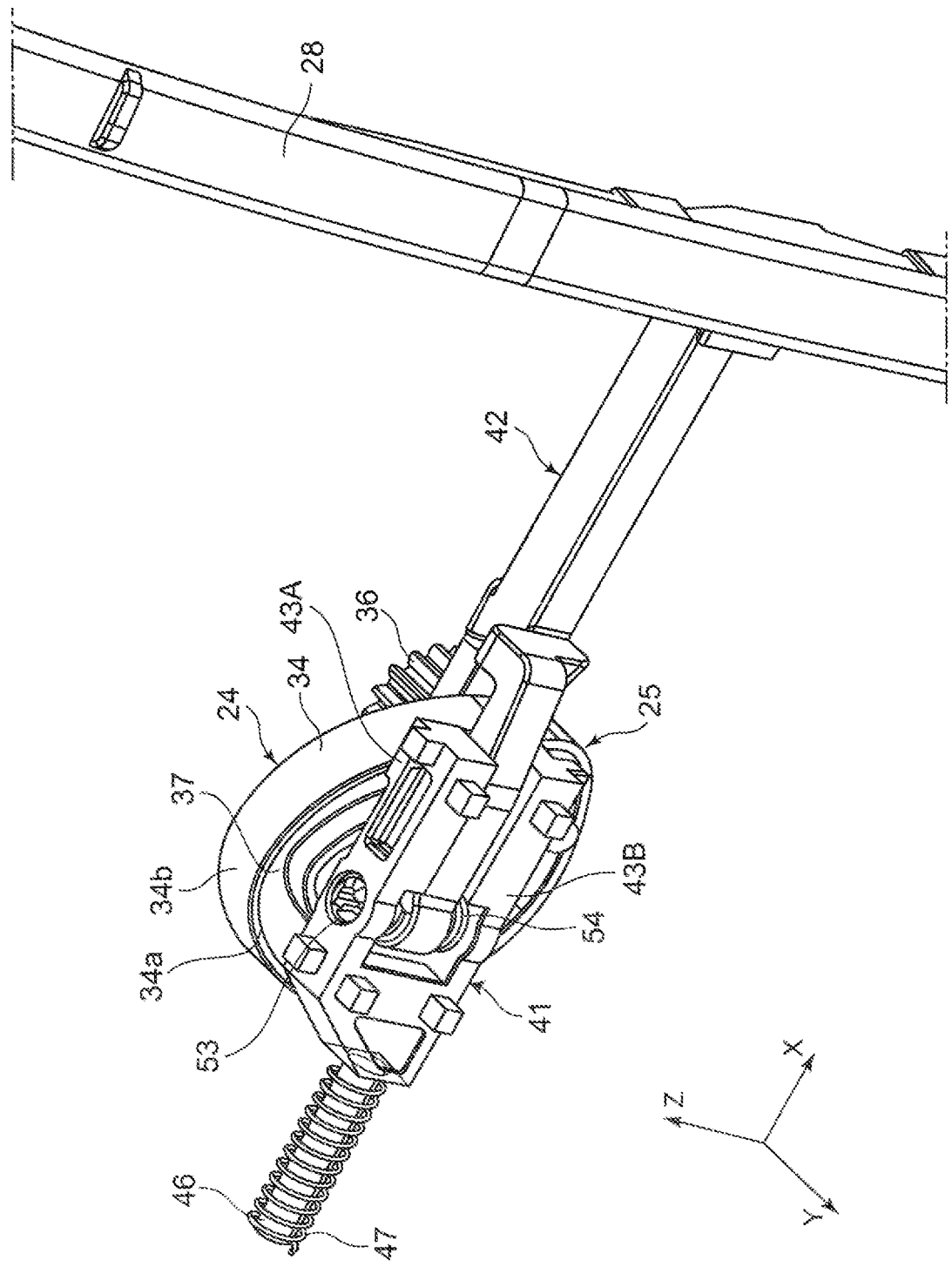
FIG. 21 is a perspective view of the output unit shown from another angle.

With reference to FIG. 6B and FIG. 21, in the first and third embodiments, the linear motion link 41 and the pivot link 42, that constitute the link mechanism 25, are arranged so as to generally face the side surface 34a of the cam body 34, whereas pinion 36 is arranged so as to face the circumferential surface 34b which is opposed to or on the opposite side to the side surface 34a of the cam body 34. Contrarily, in this embodiment, in addition to that the linear motion link 41 and the pivot link 42, that constitute link mechanism 25, are arranged so as to generally face the side surface 34a of the cam body 34, the pinion 36 is also arranged adjacent to the linear motion link 41 and the pivot link 42 so as to face the side surface 34a. In other words, on the side of the side surface 34a of the cam body, the linear motion link 41, the pivot link 42, and the pinion 36 are arranged so as to be adjacent to each other. The arrangement also can reduce the size of the output unit 7 in the Y direction. Such arrangement is described in detail below.

The linear motion link 41 includes the linear motion arms 43A and 43B arranged apart to with each other in the Z direction. A thin thickness in the X direction of the linear motion arm 43A, which is one of these arms, allows the pinion 36 to be arranged above the linear motion arm 43 in the Z direction. Further, the pivot pin 53, which pivotally supports the pivot arm 42, is integrally formed on a bottom surface side (−Z direction) of the linear motion arm 41b. Similarly to other embodiments, the bearing hole 52 for supporting the support pin 53 is formed in the base end 42a. The spring 54 attached to the pivot pin 53 is sandwiched or pinched between the linear motion arm 43B and the pivot arm 42. The pivot arm 42 is pivotally supported by the pivot pin 53 by means of a screw. Thus, the base and 42a of the pivot arm 42, the linear motion arm 43B, the pinion 36 (see FIG. 7A for example), and the rack 23 are overlapped with each other in the Z direction. Further, the pivot arm 42 is bent at the branched portion 42c so as to extend toward the cam member 24. According to this, the cam member 24 is arranged behind the tip end 42b of the pivot arm 42 similarly to other embodiments.

As described above, the pinion 36 and the rack 23 are arranged so as to be on an opposite side of the cam member 24 with respect to link mechanism 25 so as to be overlapped with the liner motion link 41 in the Z direction (the direction perpendicular to the rotary shaft 35). This arrangement reduces the size of the output unit 7 in the Y direction much more effectively than that of the third embodiment.

The invention claimed is:

1. A door edge protector device, comprising:
   a protector for covering and protecting an edge of a vehicle door;
   a cam member having a first cam portion and a second cam portion, and configured to be rotated by an input corresponding to a close/open state of the vehicle door;
   a link mechanism holding the protector, the link mechanism including a linear motion link provided with a first cam follower engaged with the first cam portion, and a pivot link provided with a second cam follower engaged with the second cam portion, and the link mechanism being configured to operate by interlocking with rotation of the cam member,
   a linear movable rack; and
   a cable configured to transmit the close/open state of the vehicle door to the rack;
   wherein the cam member includes a cam body, a rotary shaft, and a pinion attached to the rotary shaft and engaging with the rack such that engagement of the rack and pinion converts an opening and closing movement of the vehicle door transmitted through the cable into rotational movement of the cam member,
   wherein the cam member is configured to achieve a movement of the protector along a locus including an accommodation position and a set position, the accommodation position corresponding to a close state of the vehicle door, and a set position corresponding to an open position of the vehicle door with the protector covering the door edge,
   wherein the linear motion link is configured to be linearly moved in the longitudinal direction of the vehicle door in accordance with the rotation of the cam portion by the engagement of the first cam portion and the first cam follower, and
   wherein the pivot link holds the protector at an end thereof, is connected to the linear motion link pivotally in the width direction of the vehicle door, and is configured to pivot with respect to the linear motion link according to rotation of the cam portion by the engagement of the second cam portion and the second cam follower.

2. The door edge protector device according to claim 1, wherein the locus further includes a projection position between the accommodation position and the set position, the projection position being located so as to project further than the door edge in a longitudinal direction of the vehicle door and being located inwardly further than the door edge in a width direction of the vehicle door.

3. The door edge protector device according to claim 1,
   wherein the first cam portion is formed in a first surface of the cam body, the first surface being extended so as to cross the rotary shaft, and
   wherein the second cam portion is formed in a second surface of the cam body, the second surface being extended along the rotary shaft.

4. The door edge protector device according to claim 3, wherein the linear motion link and the pivot link are arranged adjacent to the cam member so as to face the first surface,
   wherein the first cam follower projects in a direction along the rotary shaft to engage with the first cam portion,
   wherein the second cam follower projects in a direction crossing the rotary shaft to engage the second cam portion.

5. The door edge protector device according to claim 1,
   wherein the first cam portion is formed in a first surface of the cam body, the first surface being extended so as to cross the rotary shaft,
   wherein the second cam portion is formed in a third surface of the cam body, the third surface being extended so as to cross the rotary shaft and opposed to the first surface.

6. The door edge protector device according to claim 5, wherein the linear motion link and the pivot link are arranged adjacent to the first cam portion so as to face the first surface,
   wherein the first cam follower projects in a direction along the rotary shaft and is engaged with the first cam portion, and
   wherein the second cam follower projects in the direction along the rotary shaft and is engaged with the second cam portion.

7. The door edge protector device according to claim 6,
   wherein the pinion is arranged adjacent to the cam body, the linear motion link, and the pivot link so as to be opposed to the first surface.

8. The door edge protector according to claim 7, wherein the rack and the pinion are arranged so as to be overlapped with respect to the linear motion link in a direction perpendicular to the rotary shaft of the cam portion.

9. The door edge protector device according to claim 5,
   wherein the pinion is arranged adjacent to the cam body, the linear motion link, and the pivot link so as to be opposed to the first surface.

10. The door edge protector according to claim 9, wherein the rack and the pinion are arranged so as to be overlapped with respect to the linear motion link in a direction perpendicular to the rotary shaft of the cam member.

11. The door edge protector device according to claim 1, further comprising a first urging member elastically urging the linear motion link toward the door edge in the longitudinal direction of the vehicle door.

12. The door edge protector device according to claim 11, further comprising a second urging member elastically urging the pivot link in a direction where the protector is moved outwardly in the width direction of the vehicle door.

13. A door edge protector device, comprising:
   a protector for covering and protecting an edge of a vehicle door;
   a cam member having a cam portion and configured to be rotated by an input corresponding to a close/open state of the vehicle door;
   a link mechanism holding the protector, the link mechanism including a cam follower engaged with the cam portion, and the link mechanism being configured to operate by interlocking with rotation of the cam member,
   a linear movable rack; and
   a cable configured to transmit the close/open state of the vehicle door to the rack;
   wherein the cam member includes a cam body, a rotary shaft, and a pinion attached to the rotary shaft and engaging with the rack such that engagement of the rack and pinion converts an opening and closing movement of the vehicle door transmitted through the cable into rotational movement of the cam member, wherein the cam member is configured to achieve a movement of the protector along a locus including an accommodation position and a set position, the accommodation position corresponding to a close state of the vehicle door, and a set position corresponding to an open position of the vehicle door with the protector covering the door edge, wherein the cam portion includes a first cam surface and a second cam surface formed in the cam member, the first and second cam surfaces being groove side surfaces defining a groove, and wherein the link mechanism includes a single cam follower engaged with both of the first and second cam surfaces.

* * * * *